(12) United States Patent
Devoe et al.

(10) Patent No.: US 9,209,474 B2
(45) Date of Patent: Dec. 8, 2015

(54) FUEL CELL DEVICE

(71) Applicants: Alan Devoe, La Jolla, CA (US); Lambert Devoe, San Diego, CA (US)

(72) Inventors: Alan Devoe, La Jolla, CA (US); Lambert Devoe, San Diego, CA (US)

(*) Notice: Subject to any disclaimer, the term of this patent is extended or adjusted under 35 U.S.C. 154(b) by 269 days.

(21) Appl. No.: 13/690,524

(22) Filed: Nov. 30, 2012

(65) Prior Publication Data

US 2013/0136953 A1 May 30, 2013

Related U.S. Application Data

(60) Provisional application No. 61/565,156, filed on Nov. 30, 2011.

(51) Int. Cl.
| | |
|---|---|
| *H01M 2/00* | (2006.01) |
| *H01M 8/12* | (2006.01) |
| *H01M 2/34* | (2006.01) |
| *H01M 8/04* | (2006.01) |

(52) U.S. Cl.
CPC ............ *H01M 8/1226* (2013.01); *H01M 2/342* (2013.01); *H01M 8/04007* (2013.01); *H01M 8/04298* (2013.01); *H01M 8/04731* (2013.01); *H01M 8/1206* (2013.01); *Y02E 60/521* (2013.01); *Y02E 60/525* (2013.01)

(58) Field of Classification Search
None
See application file for complete search history.

(56) References Cited

U.S. PATENT DOCUMENTS

| | | |
|---|---|---|
| 3,120,456 A | 2/1964 | Broers |
| 4,395,468 A | 7/1983 | Isenberg |
| 4,413,041 A | 11/1983 | Hegedus |
| 4,414,337 A | 11/1983 | Ichikawa et al. |
| 4,463,687 A | 8/1984 | Zimmerman et al. |
| 4,490,444 A | 12/1984 | Isenberg |
| 4,591,470 A | 5/1986 | Goto et al. |

(Continued)

FOREIGN PATENT DOCUMENTS

| | | |
|---|---|---|
| DE | 10117985 | 10/2002 |
| EP | 0321069 | 6/1989 |

(Continued)

OTHER PUBLICATIONS

JP2002-151100 (Kawasaki et al., English translation), Electrochemical Device, May 24, 2002.*

(Continued)

*Primary Examiner* — Patrick Ryan
*Assistant Examiner* — Jose Colucci Rios
(74) *Attorney, Agent, or Firm* — Wood, Herron & Evans, LLP

(57) ABSTRACT

Fuel cell devices are provided having improved shrinkage properties between the active and non-active structures by modifying the material composition of the non-active structure, having a non-conductive, insulating barrier layer between the active structure and surface conductors that extend over the inactive surrounding support structure, having the width of one or both electrodes progressively change along the length, or having a porous ceramic layer between the anode and fuel passage and between the cathode and air passage. Another fuel cell device is provided having an internal multilayer active structure with electrodes alternating in polarity from top to bottom and external conductors on the top and/or bottom surface with sympathetic polarity to the respective top and bottom electrodes. A fuel cell system is provided with a fuel cell device having an enlarged attachment surface at one or both ends, which resides outside the system's heat source, insulated therefrom.

16 Claims, 14 Drawing Sheets

(56) References Cited

U.S. PATENT DOCUMENTS

| | | | |
|---|---|---|---|
| 4,808,491 A | 2/1989 | Reichner | |
| 4,913,982 A | 4/1990 | Kotchick et al. | |
| 4,943,494 A | 7/1990 | Riley | |
| 5,034,288 A | 7/1991 | Bossel | |
| 5,185,219 A | 2/1993 | Ishihara et al. | |
| 5,317,805 A | 6/1994 | Hoopman et al. | |
| 5,330,859 A * | 7/1994 | McPheeters et al. | 429/465 |
| 5,356,728 A | 10/1994 | Balachandran et al. | |
| 5,380,601 A | 1/1995 | Jaspers et al. | |
| 5,770,326 A | 6/1998 | Limaye | |
| 5,827,620 A * | 10/1998 | Kendall | 429/441 |
| 5,864,743 A | 1/1999 | Tuchinskiy et al. | |
| 6,007,932 A | 12/1999 | Steyn | |
| 6,291,089 B1 | 9/2001 | Piascik et al. | |
| 6,444,339 B1 | 9/2002 | Eshraghi | |
| 6,458,477 B1 | 10/2002 | Hsu | |
| 6,767,662 B2 | 7/2004 | Jacobson et al. | |
| 6,841,284 B2 | 1/2005 | Brown et al. | |
| 6,846,511 B2 | 1/2005 | Visco et al. | |
| 6,949,307 B2 | 9/2005 | Cable et al. | |
| 7,838,137 B2 | 11/2010 | Devoe et al. | |
| 7,842,429 B2 | 11/2010 | Devoe et al. | |
| 7,883,816 B2 | 2/2011 | Devoe et al. | |
| 7,981,565 B2 | 7/2011 | Devoe et al. | |
| 7,989,113 B2 | 8/2011 | Matsuzaki et al. | |
| 8,029,937 B2 | 10/2011 | Devoe et al. | |
| 8,153,318 B2 | 4/2012 | Devoe et al. | |
| 8,227,128 B2 | 7/2012 | Devoe et al. | |
| 8,257,884 B2 | 9/2012 | Devoe et al. | |
| 8,278,013 B2 | 10/2012 | Devoe et al. | |
| 8,293,415 B2 | 10/2012 | Devoe et al. | |
| 8,293,417 B2 | 10/2012 | Devoe et al. | |
| 8,293,429 B2 | 10/2012 | Devoe et al. | |
| 8,309,266 B2 | 11/2012 | Devoe et al. | |
| 2001/0044043 A1 | 11/2001 | Badding et al. | |
| 2002/0018924 A1 | 2/2002 | Saito et al. | |
| 2002/0102450 A1 | 8/2002 | Badding et al. | |
| 2002/0146523 A1 | 10/2002 | Devoe et al. | |
| 2002/0146611 A1 | 10/2002 | Kawasaki et al. | |
| 2002/0197520 A1 | 12/2002 | Quick et al. | |
| 2003/0013046 A1 | 1/2003 | Fonash et al. | |
| 2003/0235738 A1* | 12/2003 | Zheng | 429/31 |
| 2003/0235745 A1 | 12/2003 | Mook et al. | |
| 2004/0020781 A1 | 2/2004 | Dordi et al. | |
| 2004/0020782 A1 | 2/2004 | Cohen et al. | |
| 2004/0067404 A1 | 4/2004 | Lazaroff et al. | |
| 2004/0081878 A1 | 4/2004 | Mardilovich et al. | |
| 2004/0086767 A1 | 5/2004 | Lazaroff et al. | |
| 2004/0110054 A1 | 6/2004 | Bourgeois et al. | |
| 2004/0183055 A1 | 9/2004 | Chartier et al. | |
| 2004/0185318 A1 | 9/2004 | Novak | |
| 2004/0185321 A1 | 9/2004 | Sutherland et al. | |
| 2004/0247972 A1 | 12/2004 | Kendall et al. | |
| 2004/0258972 A1 | 12/2004 | Du et al. | |
| 2005/0000621 A1 | 1/2005 | Devoe et al. | |
| 2005/0042490 A1* | 2/2005 | Finnerty et al. | 429/31 |
| 2005/0116190 A1 | 6/2005 | Adams et al. | |
| 2005/0208363 A1 | 9/2005 | Taylor et al. | |
| 2006/0003213 A1 | 1/2006 | Ketcham et al. | |
| 2006/0035130 A1 | 2/2006 | Noda et al. | |
| 2006/0113034 A1* | 6/2006 | Seabaugh et al. | 156/308.2 |
| 2006/0175194 A1 | 8/2006 | Bagby et al. | |
| 2007/0104991 A1 | 5/2007 | Devoe et al. | |
| 2007/0105003 A1 | 5/2007 | Devoe et al. | |
| 2007/0243445 A1 | 10/2007 | Digiuseppe | |
| 2007/0264542 A1 | 11/2007 | Devoe et al. | |
| 2008/0233462 A1 | 9/2008 | Curello et al. | |
| 2008/0289180 A1 | 11/2008 | Brantley et al. | |
| 2009/0123810 A1* | 5/2009 | Devoe et al. | 429/34 |
| 2009/0226781 A1* | 9/2009 | Devoe et al. | 429/20 |
| 2011/0045386 A1* | 2/2011 | Cable et al. | 429/535 |
| 2011/0117471 A1 | 5/2011 | Devoe et al. | |
| 2011/0200910 A1 | 8/2011 | Wachsman et al. | |

FOREIGN PATENT DOCUMENTS

| | | |
|---|---|---|
| EP | 0387643 | 9/1990 |
| EP | 0442742 | 8/1991 |
| EP | 0756347 | 1/1997 |
| EP | 1333519 | 8/2003 |
| EP | 1445817 | 8/2004 |
| EP | 1447871 A1 | 8/2004 |
| EP | 1612876 | 1/2006 |
| EP | 1650821 | 4/2006 |
| FR | 2877496 | 5/2006 |
| JP | 01320778 | 12/1989 |
| JP | 02075167 | 3/1990 |
| JP | 08050914 | 2/1996 |
| JP | 10189017 | 7/1998 |
| JP | 2000164239 | 6/2000 |
| JP | 2002151100 A | 5/2002 |
| JP | 2002151101 A | 5/2002 |
| JP | 2002184429 A | 6/2002 |
| JP | 2004030972 | 1/2004 |
| JP | 2004134323 | 4/2004 |
| JP | 2004152645 | 5/2004 |
| WO | 9422178 | 9/1994 |
| WO | 0124300 A1 | 4/2001 |
| WO | 0225763 | 3/2002 |
| WO | 03001624 | 1/2003 |
| WO | 03005462 | 1/2003 |
| WO | 03036746 | 5/2003 |
| WO | 03/081703 A2 | 10/2003 |
| WO | 03096469 | 11/2003 |
| WO | 2004082050 | 9/2004 |
| WO | 2006048573 | 5/2006 |
| WO | 2007005767 | 1/2007 |
| WO | 2007056518 | 5/2007 |
| WO | 2007134209 | 11/2007 |
| WO | 2008141171 A2 | 11/2008 |
| WO | 2009062127 | 5/2009 |
| WO | 2009111771 A1 | 9/2009 |

OTHER PUBLICATIONS

JP2002-184429 (Kawasaki2 et al., Abstract English translation), Ceramic gas supply member and ceramic laminated sintered body using the same, Jun. 28, 2002.*
European Patent Office, Invitation to Pay Additional Fees issued in corresponding International Application PCT/US2012/067274 dated Apr. 24, 2013, 11 pp.
NGK Insulators, Ltd., Translation of Japanese Patent Application Publication JP2002-151100, 7 pp.
NGK Insulators, Ltd., Translation of Japanese Patent Application Publication JP2002-151101, 10 pp.
Japanese Patent Office, Office Action issued in related JP Patent Application No. 2008-540191dated Mar. 19, 2013, 6 pp. (English translation of Rejections).
Japanese Patent Office, Office Action issued in related JP Patent Application No. 2009-510182 dated Mar. 19, 2013, 7 pp. (English translation of Rejections).
International Bureau of WIPO, International Preliminary Report on Patentability issued in corresponding PCT application PCT/US2012/067274, dated Jun. 3, 2014, 16 pp.
European Patent Office, International Search Report and Written Opinion issued in corresponding International Patent Application No. PCT/US2012/067274 dated Jul. 7, 2013, 24 pp.
Fuelcell Energy, Inc. et al., Thermally Integrated High Power Density SOFC Generator, SECA Annual Meeting, Pacific Grove, CA, Apr. 18-21, 2005, 42 pp., Distributed Energy Corporation.
Vora, S.D., SECA Program at Siemens Westinghouse, Sixth Annual SECA Workshop, Pacific Grove, CA, Apr. 18, 2005, 44 pp., Siemens Westinghouse Power Corporation.
Acumentrics Corporation, How Acumentrics Fuel Cells Work, 2004, 12 pp.
Vora, Shailesh D., Small-Scale Low-Cost Solid Oxide Fuel Cell Power Systems, Office of Fossil Energy Fuel Cell Program, FY 2004 Annual Report, pp. 33-35.
Zurich University of Applied Sciences, Hexis Co-Generation System, Nov. 8-9, 2004, 2 pp., Berlin.

(56) References Cited

OTHER PUBLICATIONS

Subhash C. Singhal et al., High Temperature Solid Oxide Fuel Cells: Fundamentals, Design and Applications, Chapter 1, Introduction to SOFCs, 2003, pp. 1-22.

Subhash C. Singhal et al., High Temperature Solid Oxide Fuel Cells: Fundamentals, Design and Applications, Chapter 2, History, 2003, pp. 23-51.

Subhash C. Singhal et al., High Temperature Solid Oxide Fuel Cells: Fundamentals, Design and Applications, Chapter 8, Cell and Stack Designs, 2003, pp. 197-228.

Siemens, Siemens Power Generation: Next Generation SOFC, www.powergeneration.siemens.com/en/fuelcells/seca/index.cfm?session=1142501x39517655, 2 pp. <http://www.powergeneration.siemens.com/en/fuelcells/seca/index.cfm?session=1142501x39517655>.

SOFCo-EFS Fuel Cell and Fuel Processor Solutions, Solid Oxide Fuel Cell Technology and SOFCo-EFS, www.sofco-efs.com/technology/sofctech/, 2 pp. <http://www.sofco-efs.com/technology/sofctech/>.

Ben Wiens Energy Science, Solid Oxide Fuel Cell (SOFC), The Future of Fuel Cells, www.benwiens.com/energy4.html, 2 pp. <http://www.benwiens.com/energy4.html>.

Ceramic Fuel Cells Limited, CFCLs Stack Design, www.cfcl.com.au/html/p_stack_design.htm, 3 pp. <http://www.cfcl.com.au/html/p_stack_design.htm>.

Miwa, Taiichiro et al., Japan-Finland Cooperation in Technological Research & Development: R& D Status of Fuel Cell in Japan, Jun. 15, 2005, 19 pp., DIA Research Martech Inc., Espoo, Finland.

Norrick, Dan, 10kWe SOFC Power System Commercialization Program Progress, SECA Annual Workshop, Pacific Grove, CA, Apr. 20, 2005, 67 pp., Cummins Power Generation.

Shaffer, Steven, Development Update on Delphi's Solid Oxide Fuel Cell System, 2005 SECA Review Meeting, Pacific Grove, CA, Apr. 20, 2005, 41 pp., Delphi.

GE Hybrid Power Generation Systems, SECA Solid Oxide Fuel Cell Program, Sixth SECA Annual Workshop, Pacific Grove, CA, Apr. 18-21, 2005, 28 pp., GE Energy.

Tokyo Gas Co., Ltd, Environmental Affairs Dept, Environmental Report 2004, Environmental Technology Development, Measures Taken Within the Tokyo Gas Group, pp. 28-29, Tokyo, Japan.

Bessette, Norman, Status of the Acumentrics SOFC Program, SEC Annual Workshop, Boston, MA, May 11, 2004, 47 pp., Acumentrics Corporation.

Kyocera Corporation, 1kW Solid Oxide Fuel Cell (SOFC) for Small-Scale Power Generation: Worlds Highest Efficiency for 1kW Class Power Generation, News Release, http://global.kyocera.com/news/2003/1205.html, Dec. 18, 2003, 4 pp. <http://global.kyocera.com/news/2003/1205.html>.

Talbot, David, Flying the Efficient Skies, Technology Review, www.technologyreview.com/articles/03/06innovation80603.0.asp, Jun. 2003, 1 pp.

De Guire, Eileen J., Solid Oxide Fuel Cells, Internet article, www.csa.com/hottopics/fuecel/overview.php, CSA Illumina, Apr. 2003, 8 pp. <http://www.csa.com/hottopics/fuecel/overview.php>.

Lawrence Livermore National Laboratory, Solid-Oxide Fuel Cells Stack Up to Efficient, Clean Power, S&TR, Research Highlights, Sep. 2002, 3 pp.

Nissan Motor Co Ltd, English translation of Patent Abstract of Japan Publication No. 2004-134323 entitled Solid Oxide Fuel Cell, published Apr. 30, 2004, 2 pp.

Fuel Cell Energy, Timeline, www.fce.com/site/products/sofc/timeline1.html and www.fce.com/site/products/sofc/timeline2.html, 4 pp., printed Aug. 28, 2005.

Siemens, Siemens Power Generation: Next Generation SOFC, www.powergeneration.siemens.com/en/fuelcellslsecal index.cfm?session=11425- 01x39517655, 2007, 2pp. <http://www.powergeneration.siemens.com/en/fuelcells/seca/index.cfm?session=1142501x39517655>.

SOFCo-EFS Fuel Cell and Fuel Processor Solutions, Solid Oxide Fuel Cell Technology and SOFCo-EFS, www.sofcoefs.com/technology/sofctech/, retrieved Aug. 28, 2005, 2 pp. <http://www.sofco-efs.com/technology/sofctech/>.

Ben Wiens Energy Science, Solid Oxide Fuel Cell (SOFC), The Future of Fuel Cells, www.benwiens.com/energy4. html, retrieved Aug. 28, 2005, 2 pp. <http://www.benwiens.com/energy4.html>.

Ceramic Fuel Cells Limited, CFCLs Stack Design, www.cfcl.com.aulhtml/p_stack_design.htm, 3 pp. <http://www.cfcl.com.au/html/p_stack_design.htm>, printed Aug. 28, 2005.

* cited by examiner

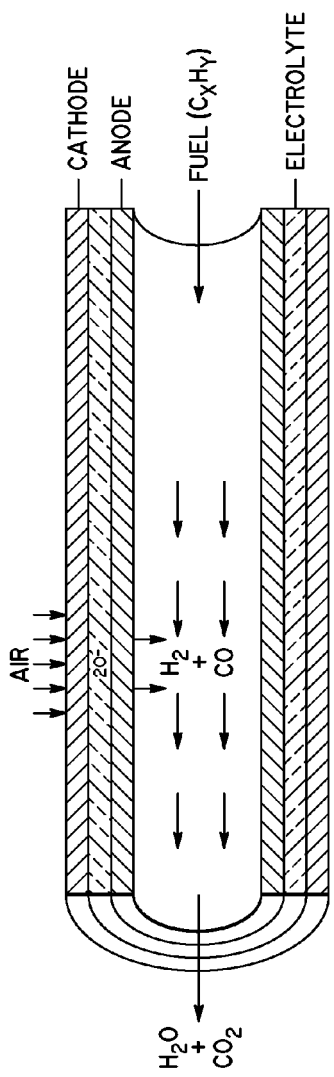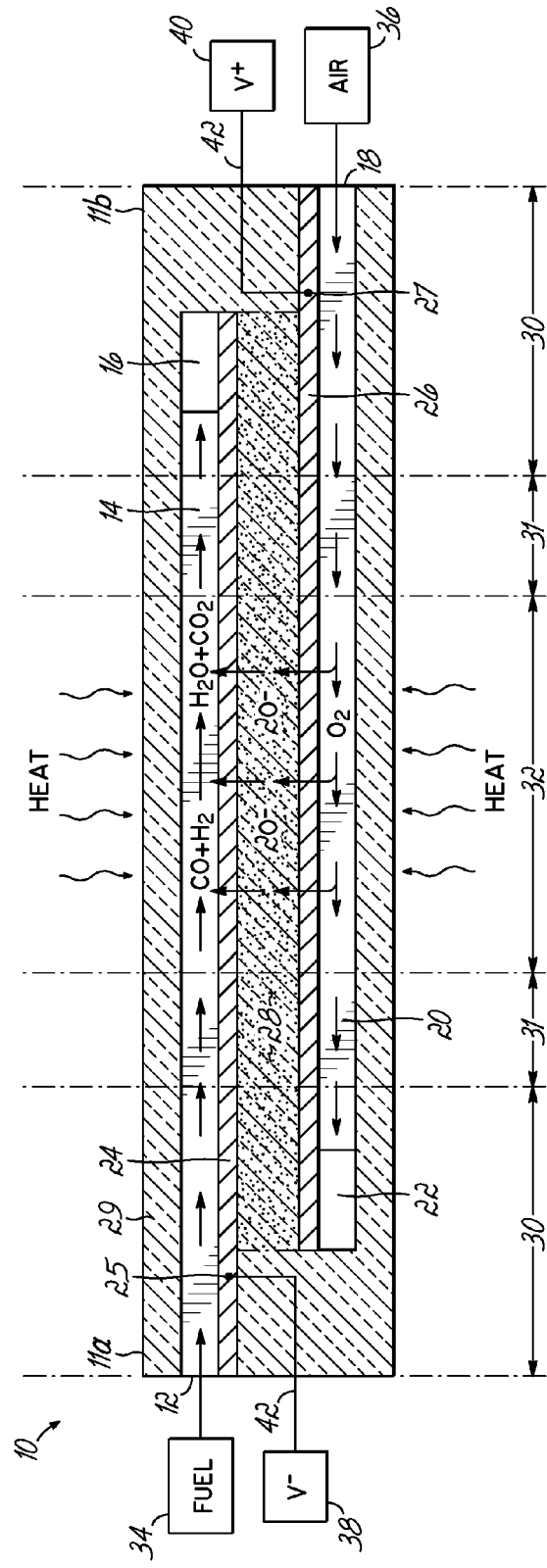

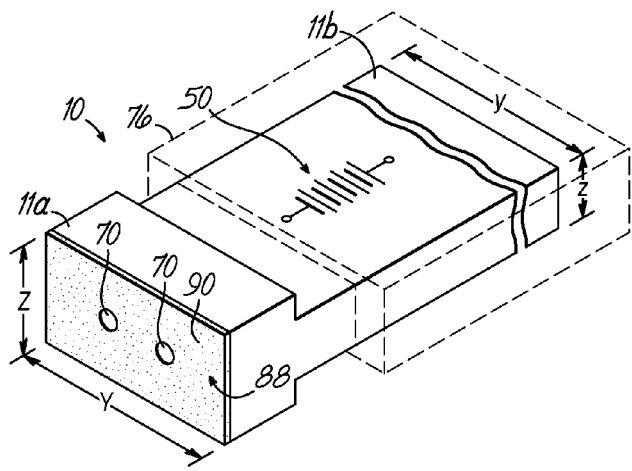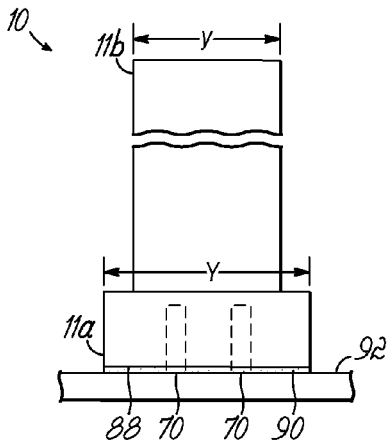
FIG. 9A  FIG. 9B
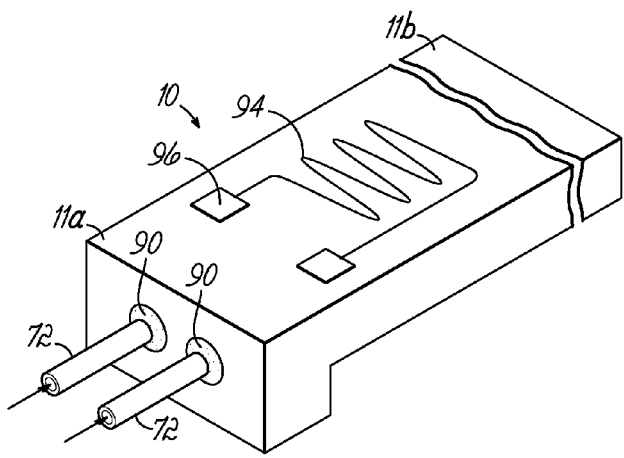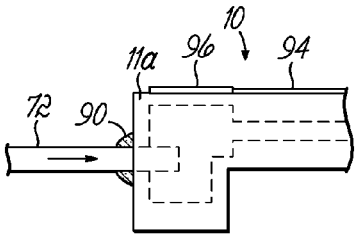
FIG. 10A  FIG. 10B
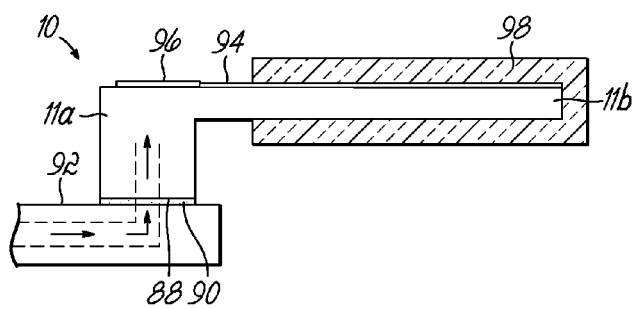
FIG. 11

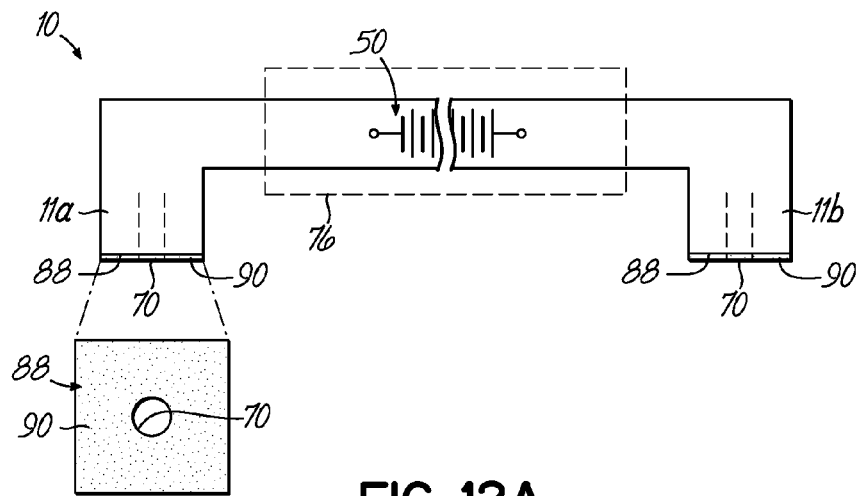
FIG. 12A
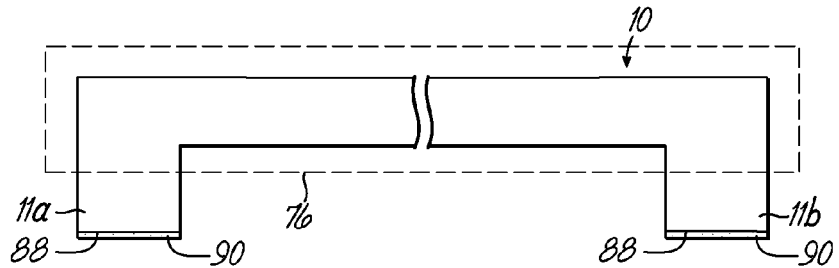
FIG. 12B
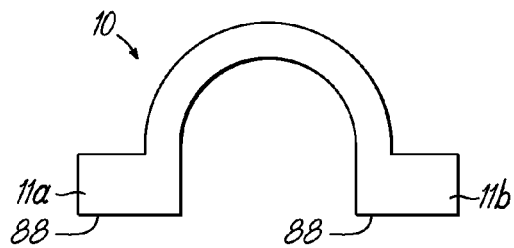
FIG. 12C
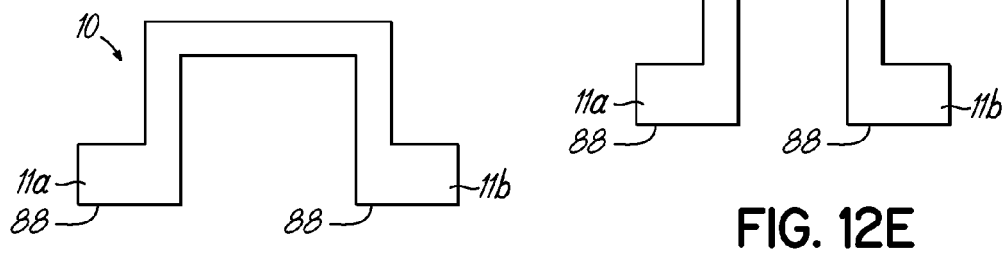
FIG. 12D
FIG. 12E

FUEL CELL DEVICE

CROSS-REFERENCE TO RELATED APPLICATIONS

Pursuant to 37 C.F.R. §1.78(a)(4), this application claims the benefit of and priority to prior filed Provisional Application Ser. No. 61/565,156, filed Nov. 30, 2011, and entitled FUEL CELL DEVICE, which is expressly incorporated herein by reference.

The present application is related to co-pending U.S. patent application Ser. No. 12/399,732 filed Mar. 6, 2009, and U.S. patent application Ser. No. 12/607,384 filed Oct. 28, 2009, and each entitled FUEL CELL DEVICE AND SYSTEM, the disclosures of which are incorporated herein by reference in their entirety.

FIELD OF THE INVENTION

This invention relates to fuel cell devices and systems, and methods of manufacturing the devices, and more particularly, to a solid oxide fuel cell device.

BACKGROUND OF INVENTION

Ceramic tubes have found a use in the manufacture of Solid Oxide Fuel Cells (SOFCs). There are several types of fuel cells, each offering a different mechanism of converting fuel and air to produce electricity without combustion. In SOFCs, the barrier layer (the "electrolyte") between the fuel and the air is a ceramic layer, which allows oxygen atoms to migrate through the layer to complete a chemical reaction. Because ceramic is a poor conductor of oxygen atoms at room temperature, the fuel cell is operated at 700° C. to 1000° C., and the ceramic layer is made as thin as possible.

Early tubular SOFCs were produced by the Westinghouse Corporation using long, fairly large diameter, extruded tubes of zirconia ceramic. Typical tube lengths were several feet long, with tube diameters ranging from ¼ inch to ½ inch. A complete structure for a fuel cell typically contained roughly ten tubes. Over time, researchers and industry groups settled on a formula for the zirconia ceramic which contains 8 mol % $Y_2O_3$, and is referred to as yttria stabilized zirconia (YSZ). This material is made by, among others, Tosoh of Japan as product TZ-8Y.

Another method of making SOFCs makes use of flat plates of zirconia, stacked together with other anodes and cathodes, to achieve the fuel cell structure. Compared to the tall, narrow devices envisioned by Westinghouse, these flat plate structures can be cube shaped, 6 to 8 inches on an edge, with a clamping mechanism to hold the entire stack together.

A still newer method envisions using larger quantities of small diameter tubes having very thin walls. The use of thin walled ceramic is important in SOFCs because the transfer rate of oxygen ions is limited by distance and temperature. If a thinner layer of zirconia is used, the final device can be operated at a lower temperature while maintaining the same efficiency. Literature describes the need to make ceramic tubes at 150 µm or less wall thickness.

An SOFC tube is useful as a gas container only. To work it must be used inside a larger air container. This is bulky. A key challenge of using tubes is that you must apply both heat and air to the outside of the tube; air to provide the $O_2$ for the reaction, and heat to accelerate the reaction. Usually, the heat would be applied by burning fuel, so instead of applying air with 20% $O_2$ (typical), the air is actually partially reduced (partially burned to provide the heat) and this lowers the driving potential of the cell.

An SOFC tube is also limited in its scalability. To achieve greater kV output, more tubes must be added. Each tube is a single electrolyte layer, such that increases are bulky. The solid electrolyte tube technology is further limited in terms of achievable electrolyte thinness. A thinner electrolyte is more efficient. Electrolyte thickness of 2 µm or even 1 µm would be optimal for high power, but is very difficult to achieve in solid electrolyte tubes. It is noted that a single fuel cell area produces about 0.5 to 1 volt (this is inherent due to the driving force of the chemical reaction, in the same way that a battery gives off 1.2 volts), but the current, and therefore the power, depend on several factors. Higher current will result from factors that make more oxygen ions migrate across the electrolyte in a given time. These factors are higher temperature, thinner electrolyte, and larger area.

Fuel utilization is a component of the overall efficiency of the fuel cell. Fuel utilization is a term that can describe the percent of fuel that is converted into electricity. For example, a fuel cell may only convert 50% of its fuel into electricity, with the other 50% exiting the cell un-used. Ideally, the fuel utilization of a fuel cell would be 100%, so that no fuel is wasted. Practically, however, total efficiency would be less than 100%, even if fuel utilization was 100%, because of various other inefficiencies and system losses.

A challenge for fuel utilization at the anode is to move molecules of fuel into the pores of the anode. Another challenge is to move the waste products, i.e., water and $CO_2$ molecules, out of the pores of the anode. If the pores are too small, then the flow of fuel inward and waste-products outward will be too slow to allow high fuel utilization.

An analogous condition exists for the cathode. Because air is only 20% oxygen, and has 80% nitrogen, there is a challenge to move oxygen into the pores and $N_2$ out of the pores. Collectively, utilization of the fuel and air input to the device may be referred to as "gas utilization."

One problem for gas utilization is that air and fuel can pass through the flow paths past the porous anodes and cathodes without the molecules ever entering the pores. The "path of least resistance" would lead a molecule to bypass the most important part of the fuel cell.

Additionally, if the gas molecules can't get into and out of the anode and cathode, then the fuel cell will not achieve its maximum power. A lack of fuel or oxygen at the anodes or cathodes essentially means that the fuel cell is starved for chemical energy. If the anode and/or cathode are starved for chemicals, less power will be generated per unit area ($cm^2$). This lower power per unit area gives lower total system power.

In a tubular fuel cell device, such as that shown in FIG. 1 where the anode lines the inside of the tube and the cathode forms the outer surface with the electrolyte therebetween, it is wishful thinking to expect high utilization of fuel. The inside diameter of the tube, which forms the fuel passage, is very large when compared to the thickness of the anode. Anode thicknesses may be on the order of 50-500 nm, whereas tube diameters may be on the order of 4-20 mm. Thus, there is a high likelihood of fuel molecules passing through the large fuel passage without ever entering the pores of the anode. An alternate geometry for the tube is to have the anode on the outside of the tube. In that case, the problem could be worse because the fuel is contained within the furnace volume, which is even larger than the volume within the tube.

Within a multilayer SOFC, such as the Fuel Cell Stick™ device 10 depicted in FIG. 2 and developed by the present inventors, fuel utilization can be higher because the flow path for the gas can be smaller. FIG. 2 is identical to FIG. 1 of U.S. Pat. No. 7,838,137, the description of which is incorporated by reference herein. Device 10 includes a fuel inlet 12 feeding a fuel passage 14 to a fuel outlet 10, and an oxidizer inlet 18 feeding an oxidizer passage 20 to an oxidizer outlet 12. An anode 24 is adjacent the fuel passage 14 and a cathode 26 is adjacent the oxidizer passage 20, with an electrolyte 28 therebetween. By way of example, both the anodes 24 and fuel passages 14 can be made to a thickness of 50 nm, and this similarity in thickness, where the ratio of thickness can be near 1:1 (or a bit higher or lower, such as 2:1 or 1:2) can give a more optimal chance of molecule flow into and out of pores.

However, as the electrolyte is made thinner, such that the power per cm$^2$ (W/cm$^2$) goes up (or as the other elements of the structure are optimized to give higher power per area), the production of waste $H_2O$ and $CO_2$ within the pores will increase. So, as power per area and volume increases, there is an increased need to exchange the gases in the porous structure more quickly.

Therefore, there is a need to better direct the gases into the pores and to flush waste products out of the pores. Higher utilization and/or better flow through the pores will give better system performance.

SUMMARY OF THE INVENTION

In one embodiment, the present invention provides a fuel cell device comprising an active structure having an anode and cathode in opposing relation with an electrolyte therebetween, and a surrounding support structure including a top cover region, a bottom cover region, opposing side margin regions, and optional interposer layer regions, the surrounding support structure being monolithic with one of the anode, cathode or electrolyte, and including a modification to its material composition configured to alter the shrinkage properties of the surrounding support structure to more closely match shrinkage properties of the active structure than in the absence of the modification. The modification to the material composition of the surrounding support structure includes one or more of the following:

(a) where the surrounding support structure comprises a ceramic material that is monolithic with the electrolyte, the material composition includes an addition of anode or cathode material in one or more of the regions;

(b) where the surrounding support structure comprises an anode material that is monolithic with the anode, the material composition includes an addition of electrolyte or cathode material in one or more of the regions;

(c) where the surrounding support structure comprises a cathode material that is monolithic with the cathode, the material composition includes an addition of electrolyte or anode material in one or more of the regions;

(d) an addition of an inorganic shrinkage control material to the material composition that is not present in the active structure;

(e) an increase in particle size used for the material composition than the particle sizes of materials used in the active structure;

(f) a decrease in particle size used for the material composition than the particle sizes of materials used in the active structure; or (g) an addition of an organic fugitive material to the material composition that is not present in the active structure or in an amount greater than present in the active structure, which organic fugitive material is removed during baking and/or sintering of the material composition to form pores or voids in the surrounding support structure.

In another embodiment, the present invention provides a fuel cell device comprising an active structure having an anode and cathode in opposing relation with an electrolyte therebetween, an inactive surrounding support structure monolithic with the electrolyte and defining a first portion of an outer surface of the device, wherein the inactive surrounding support structure lacks the anode and cathode in opposing relation and the active structure resides within the inactive surrounding support structure with the anode exposed at a second portion of the outer surface and the cathode exposed at a third portion of the outer surface. The device further comprises a first surface conductor on the second portion of the outer surface in electrical contact with the exposed anode and extending over the first portion of the outer surface, a second surface conductor on the third portion of the outer surface in electrical contact with the exposed cathode and extending over the first portion of the outer surface, and a non-conductive, insulating barrier layer between the active structure and the first and second surface conductors extending over the first portion.

In another embodiment, the present invention provides a fuel cell system comprising a fuel cell device, a heat source, and an insulating material. The fuel cell device has first and second opposing ends with an elongate body therebetween comprising an active structure having an anode and cathode in opposing relation with an electrolyte therebetween, and an inactive surrounding support structure monolithic with the electrolyte and lacking the anode and cathode in opposing relation, wherein the active structure resides within the inactive surrounding support structure, and wherein the inactive surrounding support structure adjacent the first opposing ends is larger in at least one dimension relative to a remainder of the elongate body to form a first enlarged attachment surface at the first opposing end. At least a first portion of the elongate body containing the active structure resides within the heat source for applying heat to the fuel cell device and at least a second portion of the elongate body including the first opposing end containing the first enlarged attachment surface resides outside the heat source, and the insulating material is between the first and second portions of the elongate body shielding the first opposing end from the heat source.

In another embodiment, the present invention provides a fuel cell device comprising first and second opposing ends defining an elongate body therebetween of length greater than width and thickness, an active structure in the elongate body having an anode and cathode in opposing relation with an electrolyte therebetween, and an inactive surrounding support structure monolithic with the electrolyte and lacking the anode and cathode in opposing relation, the active structure residing within the inactive surrounding support structure, wherein the width of one or both of the anode and cathode progressively changes along the length of the elongate body in the active structure.

In another embodiment, the present invention provides a fuel cell device comprising a multilayer active structure having electrode layers in opposing relation with an electrolyte therebetween, the electrode layers alternating in polarity from a top electrode layer to a bottom electrode layer, and an inactive surrounding support structure monolithic with the electrolyte and defining an outer surface of the device including a top surface, a bottom surface and opposing side surfaces, wherein the inactive surrounding support structure lacks the electrode layers in opposing relation and the active structure resides within the inactive surrounding support structure with at least one electrode layer of each polarity exposed at one of the opposing side surfaces. A first surface conductor resides on the outer surface in electrical contact with the exposed electrode layer of one polarity, and a second surface conductor resides on the outer surface in electrical contact with the exposed electrode layer of the other polarity, and the first and second surface conductors are configured to have a designated polarity in use, wherein one or both of the first and second surface conductors extend onto the top or bottom surface, and wherein the polarity of the top electrode layer is the same as the designated polarity when one or both of the first and second surface conductors extend onto the top surface and the polarity of the bottom electrode layer is the same as the designated polarity when one or both of the first and second surface conductors extend onto the bottom surface to prevent polarity mismatches between the surface conductors and the electrode layers within the inactive surrounding support structure.

In another embodiment, the present invention provides a fuel cell device comprising an active structure having an anode and cathode in opposing relation with an electrolyte therebetween, a fuel passage adjacent the anode for supplying fuel to the active structure, an air passage adjacent the cathode for supplying air to the active structure, a porous ceramic layer between the anode and fuel passage and between the cathode and air passage, the porous ceramic layer having a porosity configured to permit transport of fuel and air from the respective fuel and air passage to the respective anode and cathode, and an inactive surrounding support structure monolithic with the electrolyte and the porous ceramic layers, wherein the inactive surrounding support structure lacks the anode and cathode in opposing relation and the active structure resides within the inactive surrounding support structure.

In another embodiment, the present invention provides a fuel cell system comprising a fuel cell device having a length between opposing first and second ends that is the greatest dimension whereby the device exhibits thermal expansion along a dominant axis that is coextensive with the length, an active heated region along a first portion of the length, an inactive cold region along a second portion of the length adjacent one or both of the opposing first and second ends, an inactive transition region along a third portion of the length between the first portion and the second portion, and an electrolyte disposed between an anode and a cathode in the active heated region, wherein the anode and cathode each have an electrical pathway extending to an exterior surface of the inactive cold region for electrical connection. The system further comprises a double wall furnace comprising an inner wall and an outer wall, the inner wall defining an inner chamber therein and the outer wall defining an outer chamber, wherein the fuel cell device is positioned with the first portion of the length within the inner chamber, the third portion of the length within the outer chamber, and the second portion of the length outside the furnace. A first heating element is coupled to the inner chamber for heating the active heated region to a temperature above a threshold temperature for a fuel cell reaction to occur therein, and a second heating element is coupled to the outer chamber and operable to switch between an off position where the inactive transition region has a temperature below the threshold temperature when the active heated region is above the threshold temperature and an on position where the inactive transition region has a temperature above the threshold temperature for cleaning gas passages within the inactive transition region. A control system is coupled to the first and second heating elements and configured to switch the second heating element between the off and on positions based on one of a pre-determined cleaning schedule or a cleaning schedule triggered by real time measurements.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a schematic view of a tubular solid oxide fuel cell device of the prior art.

FIG. 2 is a schematic side cross-sectional view of a solid oxide Fuel Cell Stick™ device of the prior art.

FIGS. 9A-9B, 10A-10B, 11, 12A-12E and 13 depict various embodiments having an enlarged end for attachment purposes.

DETAILED DESCRIPTION

Figure 3:
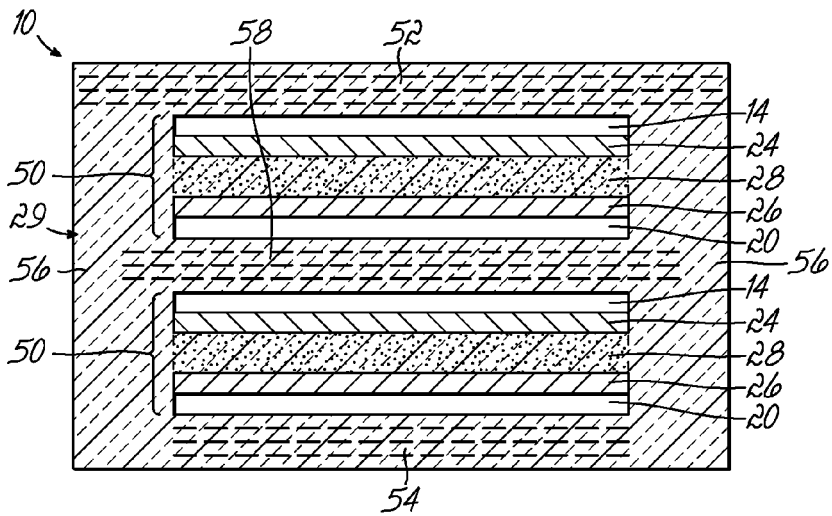
FIGS. 3 and 4 are cross-sectional schematic views depicting embodiments for reducing shrinkage mismatch between the active structures and bulk material.

Reference may be made to the following publications by the same inventors, which describe various embodiments of a multilayer Fuel Cell Stick™ device 10 (et al.), the contents of which are incorporated herein by reference: U.S. Pat. Nos. 7,981,565, 7,842,429, 7,838,137, 7,883,816, 8,293,415, 8,029,937, 8,227,128, and 8,278,013; and PCT Publication Nos. WO2007/056518, WO2007/134209 and WO2008/141171. The inventive structures and/or concepts disclosed herein may be applied to one or more of the embodiments disclosed in the above-reference published applications.

In one embodiment, extra strength is given to an active layer near the edge of the area where it merges with the sides of a device 10. Active layer (or active structure) generally means here a combination of electrolyte, anode and cathode. Similar thicknesses of anode and cathode may be used, e.g., 25 or 50 μm thickness, and the electrolyte can vary from 10 μm to 125 μm. But these dimensions are not meant to be restrictive, and in fact, the concept of this embodiment is compatible with anode or cathode supported structures, in which either the cathode or anode is much thicker than the other two layers. Also, while the use of three layers together is described, namely anode, cathode and electrolyte, there are many other combinations in which the anode or cathode can each be made from multiple layers of compatible materials in order to give a preferred performance—for example an anode made from two anode layers that have varying amounts of porosity or conductivity, such that one layer emphasizes the property of gas transport, while the other layer emphasizes the property of electrical conductivity. Thus, any of the three "layers" that form the active layer may comprise multiple layers. Similarly, anodes and cathodes may have many additives that differentiate them from structures used in the past. In reference to a single active layer in a device 10, with gas pathways above and below, and surrounded by the bulk structure, where the active layer approaches the side structure or margin in a multilayer fuel cell, there can be a point of weakness where the anode and cathode become thinner. This might not be desired in the overall design, but might occur due to alignment issues. The weak spot can occur because the anode and/or the cathode end before the active layer touches the wall of the fuel cell, so that the edge of the active area near the wall is actually thinner than the larger active layer itself. This thin region creates a point of weakness that can crack, break or tear during manufacturing or use, and thereby cause a leak of gas and degrade the performance of the fuel cell.

The active layer can be designed to travel into the wall (surrounding support structure) of the fuel cell in order to increase the strength of the active layer structure. While this may have certain advantages, it may not be enough to give the strength that is desired. Although the active layer is not thinner in this region because the entire active-layer structure extends into the wall, there is a point of stress concentration in this area of transition of the active layer into the wall.

One solution then is to add thickness to the active layer through the use of extra material. The extra material may be ceramic tape made of zirconia, which is the same material used in the electrolyte and also the walls of the device. The extra material can be the same thickness as the electrolyte, or thicker, or thinner. A key variable is the total thickness, as compared to the total thickness of the active area structure. In one embodiment, the anode and cathode do not stick into the wall of the structure; in another embodiment, the anode and cathode do stick into the wall of the structure.

To minimize stress concentration, the boundary of the added material can gradually decrease from the full thickness to zero. This can be achieved in several ways, such as through the use of multiple layers of tape or printed material, which are staggered, or through choice of material properties that allow the tape to reduce gradually on its own, such as through the use of soft materials that deform during lamination. Similar thickness can be added in other areas of the active layers. One example would be in a region between cells. While the outer edges might extend into the walls of the device, the center regions could be unsupported. The extra material that is added is conveniently made of zirconia, but that is not the only choice allowable. Many other materials could give the desired strength, including other ceramics and combinations of ceramics. Those materials could be fully dense or could be porous.

With reference to FIG. 3, fuel cell devices of the present invention include one or more active structures 50 (or cells) in which an anode 24 and a cathode 26 are in opposing relation with an electrolyte 28 therebetween, and a surrounding support structure 29 that forms the walls of the device 10. The surrounding support structure 29 may be one of the electrode materials (e.g., an anode-supported structure), but is more typically a ceramic material that is monolithic with the electrolyte 28 in the active structure 50 by virtue of being co-sintered therewith. In an elongate structure, the surrounding support structure 29 includes a top cover 52, a bottom cover 54 and side margins 56, as well as any interposer layers 58, and constitutes the bulk of the device 10. As has been previously reported, the bulk structural material (designated as ceramic 29 in FIG. 2) can be the same material or a different but compatible material than the material used for the electrolyte 28. According to embodiments herein, the bulk material used for surrounding support structure 29 may be modified, in one or more areas, relative to the electrolyte material to achieve one or more advantages as set forth below.

Shrinkage differences typically exist in the materials used to construct the fuel cell devices 10. The fuel cell devices 10 may be constructed by layering green tape materials and/or printing green materials over other layers, followed by pressing and sintering the layered structure. The shrinkage differences between materials in the different layers can manifest at various temperature ranges of processing, such as during bake out in the range of several hundred degrees C., or during the sintering phase near 1300° C. to 1500° C. When several materials are matched together, as in the active structure 50 where the anode 24, electrolyte 28 and cathode 26 are combined, the shrinkage can be different from the shrinkage behavior of the layers that form the surrounding support structure 29. Although the shrinkage of each material can be modified through the choice of particle size, calcining or organic loading, still these properties may not match exactly.

In one embodiment of the invention, to better match the shrinkage of the active structure 50 and the surrounding support structure 29, one or more of the materials used in the active structure 50 is added into the material used in one or more areas of the surrounding support structure 29. In one example, a NiO rich material, commonly used for anodes, is added into the surrounding support structure material made of mostly zirconia. NiO rich material has the advantage of being non-conductive when fired in an air atmosphere, such that it will not cause an electrical problem within the device 10. Through the addition of this material, the shrinkage of the bulk material layers can be modified to more closely match the shrinkage of the layers of the active structure. The NiO rich material may include YSZ to give chemical compatibility and to promote adhesion.

The material added to the bulk layers, indicated by dashed lines in FIG. 3, can be co-extensive with the entire structure, as shown in the top cover 52, or can cover only a smaller area, as shown in the interposer layer 58, or can only match the area of the active structure 50 itself, as shown in the bottom cover 54. Although not shown, the addition also can be smaller in area than the active area.

In some fuel cell devices, the bulk material of the surrounding support structure 29 can be a majority zirconia, where the shrinkage of that bulk material is higher than that of the layers in the active structure 50. But the opposite is possible also, depending on the factors described above, like particle size, calcining and organic loading (and other factors). The relative shrinkage of portions of a fuel cell device 10 can be modified, in accordance with the invention, by the addition of active material into the covers 52, 54 and side margins 56 of the support structure 29 so as to make the bulk material shrink more, or shrink less, during processing. Also, other materials could be added to control shrinkage that are not one of the ingredients existing in the support structure 29. Alumina could be added, for example.

The surrounding support structure 29 can also be made of multiple layers of alternating materials. For example, alternating composite layers of NiO (anode material) and LSM (cathode material), each having some YSZ (electrolyte material) added to form the composite, can be used, to best mimic the composition of the active structure 50. Substantially more than one or two total layers of added material may be used. In the covers 52, 54 of fuel cell device 10, five layers each of more than one material could be added to give substantial matching to the active structure 50.

In another embodiment of the invention to address shrinkage differences, the bulk material of the surrounding support structure 29 is made using larger or smaller particle size than the particulate size used in the layers of the active structure 50. For example, in a device 10 where the bulk material is made from zirconia, a larger or smaller particle size will give alternate shrinkage behavior when compared to the standard zirconia material used for the electrolyte 28 and surrounding support structure 29. The same concept applies with other materials besides zirconia, including various doped zirconia formulations (e.g., different levels of yttria) or alternate types of electrolytes used in SOFCs. This concept further applies to devices constructed in an anode-supported or cathode-supported way (in which anode or cathode style material forms the covers 52, 54, side margins 56, and interposer layers 58).

Another embodiment for modifying the device materials is to add or remove oxides that can modify the shrinkage of the bulk material. For example, alumina as an addition to zirconia in small percentages (in the range of 0.05% to 0.5%, but possibly higher or lower) will allow the zirconia to sinter at a lower temperature. This modifier can be added into the active structure 50 but not in the bulk material, for example, to modify the shrinkage. Other additives could be used, instead of alumina, to work in a similar way.

Another embodiment to modify the shrinkage of the surrounding support structure 29 is to add more organic material to the ceramic tape used as the bulk material. For tape casting, the organic material can commonly be made from vinyl or acrylic, but many other organic materials may be suitable. Additional organic content in the tape that is used for the bulk material can make the surrounding support structure material shrink more. This concept is useful even if ceramic tape is not the only method of building up the device 10. For example, some materials are screen printed instead of using a tape process, and addition of higher organic content in that format would also result in higher shrinkage.

In another embodiment, the bulk material used for the surrounding support structure 29 is modified to achieve additional strength in the device 10. Specifically, a different material is selected for the surrounding support structure 29 than used in the active layers to impart a higher strength to the surrounding support structure 29. This description will focus on zirconia, but is applicable to other material systems also by analogy.

It is known in the industry that zirconia with 8% yttria (8% YSZ) added gives good performance as an SOFC active layer, meaning that it will transport oxygen ions at a high rate. However it is also known that zirconia with 3% yttria (3% YSZ) added gives good performance for strength, such that it is often used to make structural zirconia pieces for mechanical uses. In certain embodiments of the invention, these two materials are combined into one device design, such that the active structure 50 using 8% YSZ has high ionic conductivity while the surrounding support structure 29 using 3% YSZ has higher mechanical strength, giving an advantage to the overall system durability. While the 3% YSZ is commonly known to have high strength, that is not to say that the strength of the 8% YSZ is weak; it is actually quite strong also, but it is possible that the overall system durability could be improved using this technique.

Additional advantages can be achieved by reducing the amount of zirconia in the surrounding support structure 29. Zirconia is a relatively expensive material, such that cost reduction is one advantage.

Figure 4:
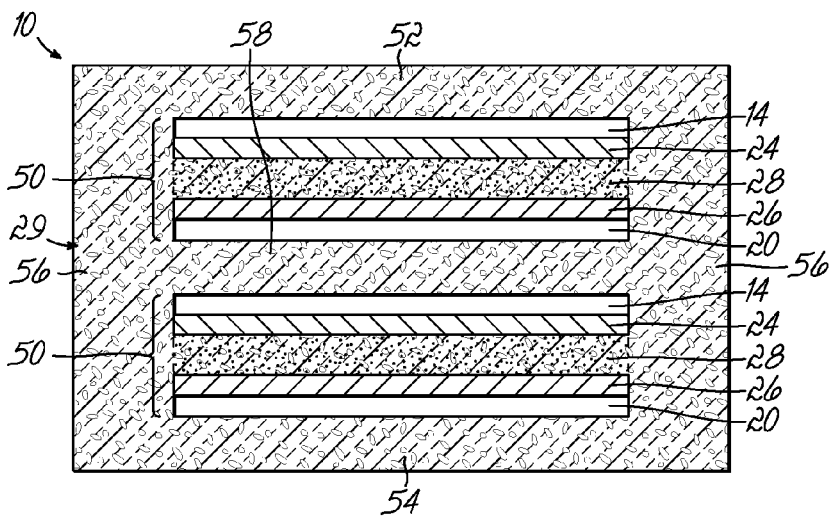

In one embodiment, air gaps are introduced into the bulk material of the surrounding support structure 29 in place of zirconia, as depicted in FIG. 4 in schematic cross-sectional view. In the manufacture of anodes 24 or cathodes 26, pore-forming materials can be added thereto to create gas pathways; a similar approach of using fugitive materials can be followed with the bulk material albeit for a different purpose.

Various organic materials can be used that will burn out cleanly from a ceramic material, leaving voids. Any material that will leave an empty space or void after sintering is a possible choice. These organic materials can be varied, including polymer balls, graphite, or any other fugitive material, but a suitable choice is polymer beads, for example made by Sekisui of Japan. These polymer beads or particles burn out cleanly from the ceramic during the bake and sinter profile, and they have the advantage that they are made using materials that will not easily dissolve in solvents (meaning that the polymer beads can successfully be processed in a solvent environment without having the particles dissolve, which is useful for example in solvent-based tape casting).

When these particles or beads are used in formation of pores in an anode 24 or cathode 26, the goal is to have pores that are on the scale of 0.1 μm to 15 μm, commonly. To reduce the amount of zirconia that is used in the surrounding support structure 29 of a device 10, the pores formed can be the same size or much larger, for example, on the order of about 10 μm, about 50 μm, or about 250 μm. For each pore formed, an equivalent amount of zirconia is saved.

In addition to the mass savings (and therefore cost savings), an additional advantage is reducing the thermal mass of the device 10 in the bulk surrounding support structure 29. That reduction can allow the device to heat faster, and with less added heat to achieve a desired operating temperature. With a lower mass, a given device could further be more resistant to thermal shock because it can heat or cool more quickly. Yet another advantage is the reduction of the total system weight, which may be useful in various applications, including airborne applications.

Rather than pores, alumina can be used as the substitute in the surrounding support structure 29 for all or a portion of the zirconia, for the purpose of saving cost, as alumina is commonly less expensive than zirconia. The bulk material can be made from tape that is cast from alumina and then used in the layered assembly. Care must be taken to have the alumina match the zirconia in the active structure 50 so that the materials do not come apart. One method is to add a certain percentage of zirconia to the alumina to help match the materials. The zirconia savings would be proportional to the amount of alumina substituted for zirconia. Also, a boundary layer that provides adhesion between a region high in zirconia and a region high in alumina may be useful. This boundary region might be made from approximately half zirconia-half alumina. The zirconia and alumina materials system is used as an example, however, the principle can easily be extended to other materials systems that are used in SOFC devices.

As has been discussed, zirconia is a commonly used material in fuel cells. Because zirconia is an ionic conductor, a voltage can be measured across a bulk of this material when there is a lack of oxygen on one side versus the other. On the one hand, this is the basic principle of the SOFC: fuel on one side of an SOFC layer provides the lack of oxygen, and air or $O_2$ on the other side provides the opposite, and together this gives the driving force for the fuel cell. In multilayer devices of the invention, this can provide a challenge. When conductors are placed on the outside surface of the device, there can be a net voltage that is measured between the outside surface and the inside pathways in the active structure. The result is that on a fully functioning, optimal device that should give an open circuit voltage (OCV) in the range of 1.0V to 1.3V, a lower voltage may be measured. From a practical point of view, it appears that this lack of optimal (as measured) OCV results from the voltage drop between the outside conductor on the device and the internal conductor. By way of example, instead of measuring 1.1V OCV, the measurement may be near 0.85V OCV.

This presents a practical problem in development, because it is difficult to know whether the device is performing to optimal standards. In addition, this problem could make it difficult for an automated system to adequately monitor the device in operation. Because power is equal to the voltage times the current, if the voltage can't be accurately predicted, then the power can't be accurately predicted. In addition, it is possible that having this kind of loss on the cell could degrade the performance per se, such as by reducing the driving force for the operation, though this can't be stated with certainty.

To overcome this discrepancy between the predicted and measured voltage, and as depicted in schematic end view in FIG. 5, a portion of the surface of the device 10 may be coated with glass or other non-conductive, insulating material before or after sintering to form a surface non-conductive layer 60 between the surrounding support structure 29 and the surface conductors or contact pads 44, at least in areas where the surface conductors 44 will be located but are not in direct contact with the anodes 24 and cathodes 26 exposed at the surface. By non-conductive, reference is made to conducting of electrical voltage and current in the traditional sense and/or ionic conducting, for example, transporting of oxygen or some other atomic constituent.

A colored glass may be used to provide a contrast that would allow easier inspection as to the coverage over the white ceramic, though a clear glass would also be suitable. A non-conducting ceramic can also be used, for example NiO when the device is used in an air or oxidizing atmosphere (e.g., the surrounding gas is air). With the non-conducting ceramics, other oxides may be added in to give special properties, such as adhesion. For example, a small fraction of zirconia can be added to NiO for adhesion to bulk zirconia used for the surrounding support structure 29, or aluminum oxide (alumina) can be added for adhesion to the surrounding support structure 29 when also used to substitute for all or a portion of the zirconia in the bulk material as discussed above. Many other materials could be used, such that they give the property of providing a non-conductive barrier between the surface conductors 44 and the surrounding support structure 29.

Based on using different types of materials, the assembly of this surface non-conductive layer 60 can occur before or after firing. For example, glass that contains a softening point below the sintering temperature of the ceramic is best placed on the structure after the sintering process due to the high mobility of the glass above the softening point. By way of example and not limitation, after a sinter near 1300-1400° C., the glass can be added by screen printing onto the surface and then firing at a temperature near 800° C.

Figure 5A:
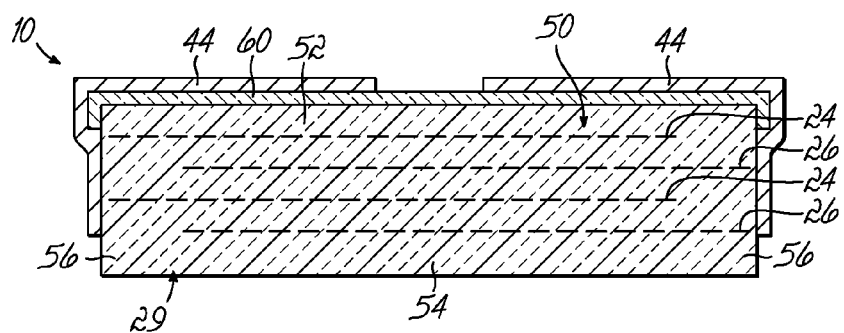
FIG. 5A is a schematic end view of an embodiment for overcoming discrepancies between predicted and measured voltage.

In FIG. 5A, a multilayer active structure 50 is shown with the anodes 24 exposed to the left side margin 56 and the cathodes 26 alternatingly exposed to the right side margin 56 of the device 10. The contact pads 44 are applied to the top cover 52 and the respective side margin 56 to make contact with the exposed anodes 24 or cathodes 26. The surface non-conductive layer 60 is applied to the surface of the top cover 52 of the surrounding support structure 29 before applying the contact pads 44 to provide a barrier therebetween. The surface non-conductive layer 60 is not applied on the side margins 56 to avoid areas where the contact pads 44 must make electrical contact with the exposed anodes 24 and cathodes 26, and is not applied to the bottom cover 54 where the contact pads 44 are not applied, as no barrier is needed there.

Figure 5B:
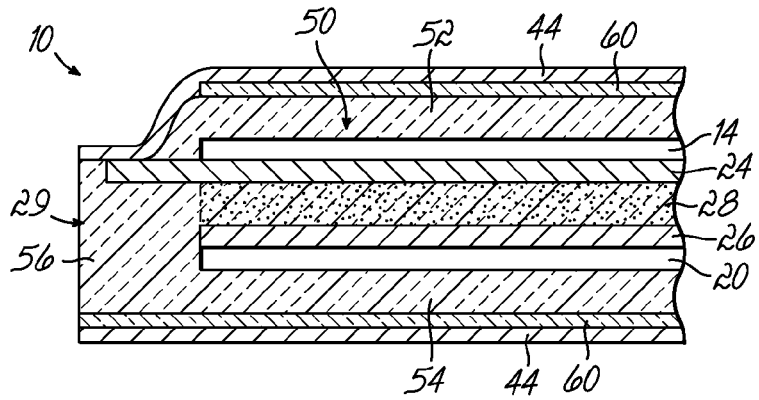
FIGS. 5B-5D depict in cross-sectional end views alternative embodiments to that of FIG. 5A.
Figure 5C:
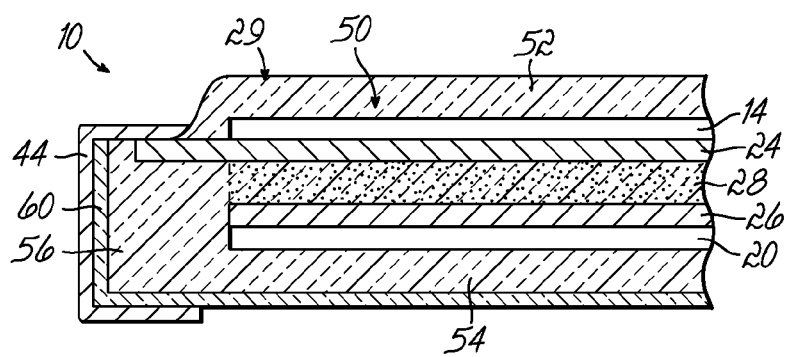
Figure 5D:
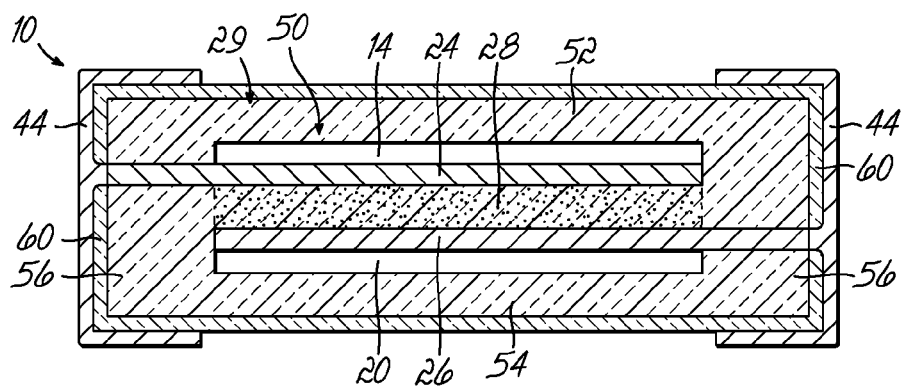

In FIGS. 5B-5D, variations on possible coating configurations similar to that of FIG. 5A are shown by way of example but not limitation. In the partial cross-sectional end view of FIG. 5B, the top cover 52 does not extend completely to the side of the device 10 so as to expose a small surface of the anode 24 at the top of the device 10. The same can be done for the cathode 26 at the bottom of the device 10, though not shown. The surface non-conductive layer 60 is then applied to the top and bottom covers 52, 54 and the contact pads 44 are applied over the non-conductive surface layers 60 and extend to the side to cover the exposed anode 24 (and cathode 26). The side margins 56 are left un-coated. This embodiment lends itself to a tape casting method for forming the entire device 10. In FIG. 5C, which is similar to FIG. 5B with respect to the anode 24 being exposed at the top surface, the contact pad 44 is applied to the side margin 56 and extending slightly onto the top and bottom thereby covering the exposed anode 24 (and cathode 26), such as by dipping the sides into a plating bath until the point where the top cover 52 begins, or by screen-printing. The surface non-conductive layer 60 is first applied to the side margins 56 for applying the contact pads 44, and can also be applied to the bottom cover 54. In FIG. 5D, the surface non-conductive layer 60 is applied to the entire surface except where the anode and cathode are exposed at the side margin, which can easily be done with tape casting, and then the side margins 56 of the device 10 can be dipped in the plating bath or screen printed to apply the contact pads 44.

In an alternate example, NiO can be added to the surfaces of the surrounding support structure 29 before sintering of the entire device 10. This NiO can be made into a tape form, and then laminated onto the surface in order to give a simple process that provides a uniformly thin surface non-conductive layer 60. Alternate methods can be used to adhere the NiO onto the green device, such as screen printing. There are various ways to provide a surface non-conductive layer 60, including adding it before or after the sintering step, as can be appreciated by persons skilled in the art. Similarly, the contact pads 44 can be co-fired conductors, as well as added to the surface after firing. In terms of co-fired conductors, precious metals, such as platinum, can be used or conductive oxides, such as LSM. A wide variety of materials are compatible as conductors, and the surface non-conductive layer 60 material may be selected based on the materials used for the surrounding support structure 29 and the contact pads 44.

Figure 6A:
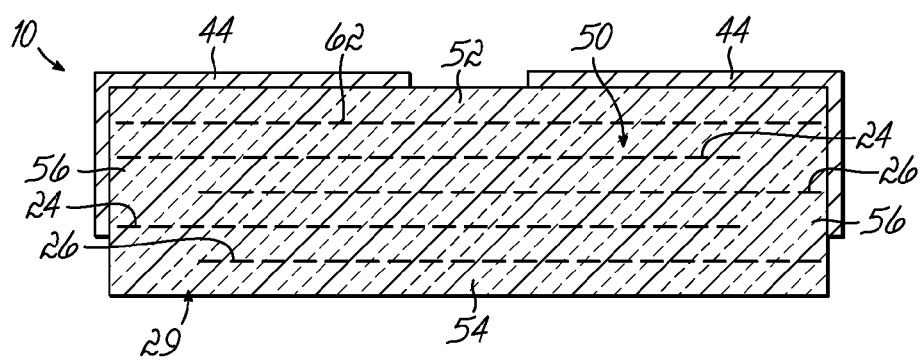
FIGS. 6A and 6B are cross-sectional schematic end views depicting internal non-conductive layers for insulation.
Figure 6B:
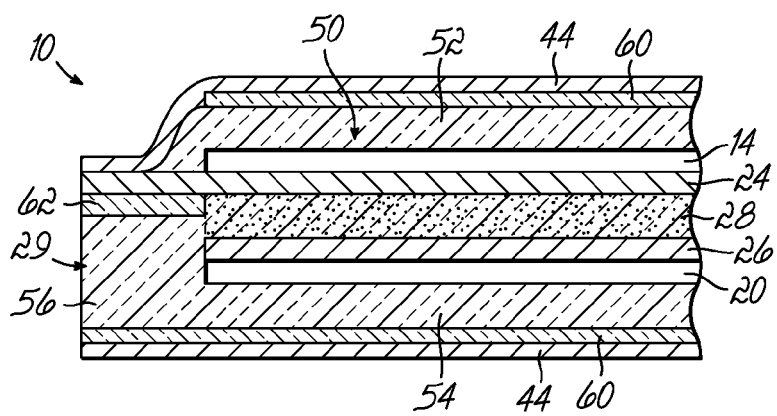

According to another embodiment, another way to achieve the insulating goal is to build the non-conductive layer inside the device at the time of manufacturing. This is similar to the NiO coating described above, but it can be put inside the surrounding support structure 29 as an internal non-conductive layer 62, as shown in FIG. 6A, to effectively break up the continuity of the bulk material between the active structure 50 and the surface(s) on which the contact pads 44 reside. NiO is just an example, as many other materials can meet the need in a similar way, of being non-conductive to electrons, or to ions, or both at the same time. By putting the non-conductive layer 62 into the device, instead of using it at the surface, some advantages can be obtained. The issue of adhesion of the material to the surface can be relieved, since the oxide layer is covered on both sides by the bulk material of the surrounding support structure 29 instead of on just one side. Also, the outside appearance of the device 10 can be maintained in a uniform style, such as the all-white look of the zirconia body. Further, an oxide layer can be more easily automated into the manufacturing process by making it part of the internal design. Finally, the advantage of putting the non-conductive layer 62 into the structure 29 is that the material can be placed in any location within the device 10, and can reduce the amount, and thus cost, of the bulk material as described above. By way of further example, the dashed lines in FIG. 3 could represent internal non-conductive layers.

Where the electrode (anode 24 or cathode 26) or an internal conductor is brought out to the edge of the device, i.e., the conductor extends from the internal anode 24 or cathode 26 out to a contact pad 44, it may be useful to have passivation under the electrode or internal conductor in the inactive region where it is exposed to air (or fuel, whatever the atmosphere is outside the device). However, when this electrode is built as part of the initial green construction of the device, it is not possible to add passivation under the fired electrode (unlike the other regions on the outside of the device, where the non-conductive layer can be coated first, followed by adding the conductors.) Thus, FIG. 6B shows an internal non-conductive layer 62 built into the device under the electrode (shown with anode 24) in the side margin 56 of the surrounding support structure 29 to separate the conductor from the bulk material of the stick (for example, the YSZ).

It is noted that nickel oxide is used in two different chemical states in the structure overall. When NiO is used in the anode, there is a reducing gas present and some large portion of the NiO reduces to Ni metal, thereby providing an electrically conductive material. On the other hand, when NiO is used as an electrical insulator in the zirconia material, or on the surface of it, there is no reducing atmosphere (or at least not a substantially reducing atmosphere to change the state of the Ni) and therefore the NiO will remain as a non-conductive oxide.

The publications referenced above disclose the use of relatively large tubes placed over the ends of the device that can access the entry points of the gas passages 14, 20, which have typically been depicted as relatively large openings, formed by burn-out of sacrificial layers or removal of wires after lamination. An alternative is to put multiple small openings at the end of the device for gas to enter, which openings are then fluidicly coupled to the larger gas passages 14, 20. In this design, the large tube would then allow gas to pass into all of the small holes that have been created. For example, latex tubes or metal tubes can be used, and these tubes can be sealed with glue, adhesive or epoxy.

Figure 7A:
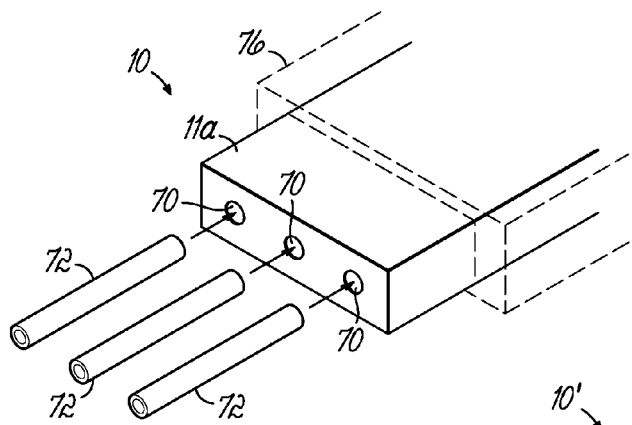
FIGS. 7A and 7B are partial perspective views depicting gas supply tubes for feeding gas to small input holes for feeding discrete active layers or multi-layer active structures.
Figure 7B:
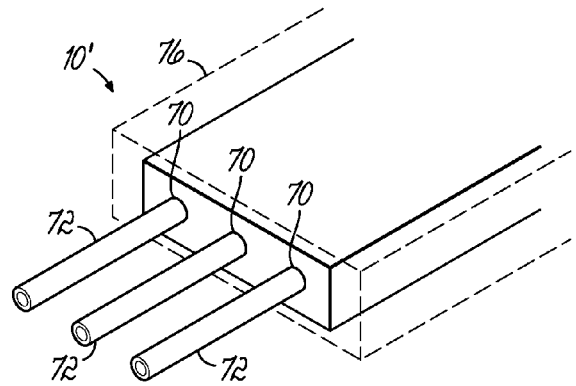

In an alternative embodiment, depicted in FIGS. 7A-7B, small input holes 70 can be used to supply gas individually to discrete active layers or multi-layer active structures within the device 10 using multiple gas supply tubes 72. One advantage is that during testing, it is important to check for leaks within the device 10. If gas is inputted into just one hole that is coupled to just one of multiple active layers or to just one of multiple multi-layer active structures, it can then be determined if the gas exits from just one other hole. During use, the device 10 could be operated with less than the available active layers or structures, if desired, by flowing gas into less than all of the input holes 70.

In one example, the input holes 70 are created by wires (not shown) that are approximately 0.040 inch. The wires are removed in the green state. After sintering, the input hole diameter is a uniform 0.032 inch. For testing, a small metal tube, often made from stainless steel, with an outside diameter of 0.030 inch can be used. These tubes are commonly available for dispensing applications, with varied lengths and diameters, and may conveniently include an adapter that easily mates with a gas supply line. A tube is inserted into one of the input holes 70 on the device 10, and a sealant is applied. The sealant can be made from a variety of materials: organic adhesive such as latex rubber cement or glue; inorganic adhesive such as silicone; or high temperature sealant such as a glass type material.

This method can be used for operating a device 10 having at least one cold end 11a that extends outside of a furnace 76, as shown in FIG. 7A, whereby the gas supply tubes 72 are sealed into the input holes 70 outside of the furnace. Alternatively, this method can be used with a device 10' that does not extend from the furnace 76, as shown in FIG. 7B, where a multitude of tubes 72 can make connection to a hot multilayer fuel cell structure inside the furnace 76, and only the gas supply tubes 72 would exit from the furnace 76. In this example, the sealant at the ends of the gas supply tubes 76 would be the high temperature type, such as a type of glass. The dashed lines represent the boundaries of the heated area, such as a furnace wall. Additionally, in these embodiments, the tubes can also be made out of ceramic, which may be co-sintered with the surrounding support structure 29. Alternatively, if the gas supply tubes 72 are made out of metal, they can at once carry gas and carry electrical current and or voltage.

Figure 8A:
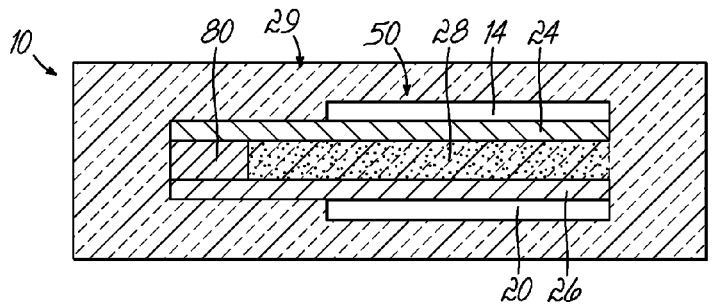
FIGS. 8A and 8B depict in cross-sectional end view and schematic end view, respectively, embodiments for making interconnections between anodes and cathodes in a multilayer structure.

FIG. 8A depicts one embodiment for making an interconnection between the anode 24 and cathode 26 in a multilayer structure. In related applications referenced above, several methods of interconnecting an anode and cathode have been shown, including one where the interconnect material would extend through the bulk material of the device, most commonly YSZ, into both the anode and cathode. Many variations are possible on this structure, for example the conductive material can be made out of a precious metal (Pt, Pd, Ag, Au, or alloys and combinations that contain one or more of these metals), or out of a non-precious metal alternative such as LSM or other conductive ceramic, or stainless steel or other non-oxidizing metals. However precious metal is presently believed to be superior in terms of conductivity. More importantly, the material used for an interconnect conductor must be resistant to reduction (giving up its oxygen) on one side, and/or oxidation on the other side. It is anticipated that such materials that have good stability in oxidizing and reducing atmospheres and high conductivity will be created over time. Further, the interconnect conductor can be a mixture of conductive and non-conductive materials, such as a blend of precious metal and YSZ that would give both conductivity and adhesion to the bulk ceramic (YSZ). Or, the precious metal can be coated around ceramic particles, as a way of reducing the quantity of metal used.

One of the key challenges for the use of precious metal as an interconnect conductor is to reduce the amount of metal as much as possible, in order to lower cost. In one embodiment, shown in cross-section in FIG. 8A, an alternative solution is to have the anode 24 and cathode 26 overlap, and to provide a thin interconnect conductor 80 between them. In this design, the interconnect conductor 80 would be non-porous in order to keep the oxidizing and reducing atmospheres separate. As above, precious metals or non-precious conductors can be used, with precious metals being advantageous in many ways, except for their cost. Other alloys or conductive ceramics would work also, if their material properties can handle the reality of the working conditions, or the interconnect conductor 80 can be a mix of materials, precious metals coated onto a non-conductive core to save on quantity and therefore cost, and/or can have portions of ceramics added in to help with adhesion to the anode 24 and/or cathode 26. In any event, the interconnect conductor 80 should be continuous and non-porous in order to keep the oxidizing and reducing atmospheres separate.

It should also be seen that these anode and cathode areas overlapping with the intervening interconnect conductor 80 are not necessarily anodes 24 and cathodes 26 that are functioning as an active layer, in this region near the interconnection. The anode and cathode materials, in one embodiment, are extensions of the anode and cathode material away from the active structure 50 toward an area that is devoted to this interconnect. One advantage is that the amount of air and fuel is not substantial (that is, while the amount of air and fuel is enough to maintain the oxidative or reduced state of the cathode 26 and anode 24 in the active area, the gases are not flowing in large quantities in the interconnect area. This is useful because, while the desire of the interconnect conductor 80 is to act as a barrier seal between anode 24 and cathode 26, such a material is unlikely to be completely non-porous. Small holes may exist. It is expected, however, that equilibrium can be achieved to allow the materials to stay in their proper oxidized/reduced states.

Figure 8B:
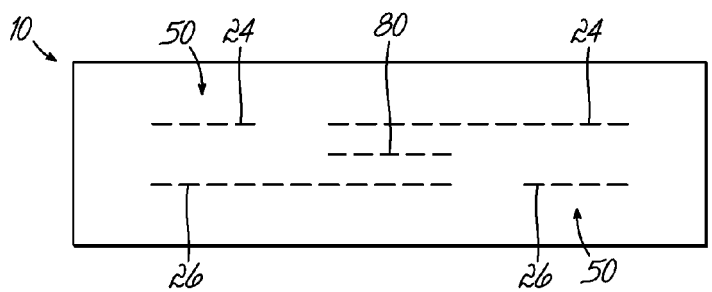

FIG. 8B schematically depicts how this overlapping area may interact with the larger device design. In this case, the overlapping anode 24, cathode 26 and intervening interconnect conductor 80 act to connect two cells or active structures 50 in series (i.e., connects the cathode 26 of one cell to the anode 24 of the next cell). It is further possible and advantageous to have various material variations in the anode or cathode construction. Properties like ionic conductivity, electrical conductivity, and porosity can all be optimized for certain regions of an anode or cathode. For example, though depicted as a homogeneous material, the portion extending into the interconnection area may have a variable composition from that portion of the anode 24 or cathode 26 in the active structure 50.

As may be appreciated, the various designs for the fuel cell devices discussed herein and in the related applications can be made relatively large or small. At the large end, it may be envisioned that they can be used to power large transport ships. At the small end, they can be used to power miniature devices such as small electronics, for example phones and other electronic gadgets. To better enable use as miniature fuel cell devices, certain improvements or modifications may be made, as discussed more fully herein below.

FIG. 9A shows a device 10 that is similar to previously described devices 10, having an elongate body between opposing ends 11a, 11b, but with several modifications. One end 11a may be made larger than the elongate body of the device 10, which can be useful if the scale of the elongate body does not allow convenient attachment to a desired substrate. For example, if the elongate body has a thickness z of 0.5 mm, then it would be useful to have a thickness Z at the end 11a of 2-4 mm to allow for easy attachment and/or to allow for higher strength at the attachment point. The attachment surface 88 of end 11a is further shown with an adhesive or attachment material 90 thereon to facilitate attachment to a substrate 92, as shown in FIG. 9B. The input holes 70 provide entry points for the gas to enter the device 10 through the substrate, as desired.

The elongate body in which the active structure(s) 50 reside (as represented by the circuit symbol) is shown as being thinner than the end 11a of the device 10, but it also could be narrower in width y than the width Y of the end 11a, as shown in FIG. 9B. For example, the active structure 50 of the device 10 should not be any larger than necessary in order to allow rapid heating and reduced chance of thermal shock. The device 10 can stand up tall on the larger end 11a, and the attachment material 90 can hold it in place. The input holes 70 can be surrounded by the attachment material 90, so that the attachment material 90 provides the mechanical attachment but also provides a sealing mechanism around the gas entry points. As further shown in FIG. 9A, the large end 11a of the device may be a cold end positioned outside a heat source 76, such as a furnace or hot box, and shielded from the heat source 76 by insulating material, such as a furnace wall, and a portion of the elongate body having the smaller dimensions and containing the active structure(s) 50 may be contained inside the furnace 76 to form an active reaction zone for the fuel cell.

FIGS. 10A-10B further show use of gas supply tubes 72 as the attachment mechanism for the device 10 in addition to supplying the flow of gas into the device 10, as shown by the arrows. The gas supply tubes 72 are inserted into the end 11a of the device 10, and can be made from many materials, organic or inorganic, metallic or ceramic, that have sufficient structural integrity to support the device 10. If the gas supply tubes 72 are also conductive, they can serve the additional purpose of conducting electricity to the active structure. Attachment material 90, such as solder, adhesive, or glue, can seal the tubes 72 into place. The attachment material 90 can extend into the device 10, so that it attaches the tubes 72 to the inside walls of the device 10. As further depicted in FIG. 10A, the small device 10 can have resistance heating elements 94 on the surface of the device 10 to provide heating during start up and operation. The resistance heating elements 94 can have a serpentine pattern for even heating, or can be straight. End contacts 96 for the resistance heating elements 94 can come out to the cold end 11a of the multilayer device 10, for easy connection. The device 10 may be placed with the elongate body extending into a furnace or other heat source 76 similar to shown in FIG. 9A. The end contacts 96 can be attached using solder to a circuit board, as shown and discussed hereafter.

FIG. 11 shows the device 10 having the attachment surface 88 of a large cold end 11a mounted to a substrate 92, such as a circuit board, and the smaller elongate body with the hot reaction zone and hot end 11b contained inside insulation 98. The insulation 98 can be made from ceramic fiber insulation, mostly containing alumina-silicate ceramic, or any other suitable type of insulation. The substrate 92 may be configured to provide the flow of gas into the device 10, as depicted by the arrows.

For surface mounting, device 10 can be shaped similar to an arch, with attachment surfaces 88 at both enlarged ends 11a, 11b, as depicted schematically in FIG. 12A. Each of ends 11a, 11b are cold ends for mounting to a substrate outside and/or shielded from a furnace or other heat source 76, and only the portion of the elongate substrate therebetween containing the active structure 50 is exposed to the heat source 76. The two point attachment can give good mechanical stability in case of vibration, and flexibility of the substrate can prevent cracking in the device 10. The attachment material 90 can be conductive or non-conductive material. Solder is an example of a conductive material. The attachment material 90 can provide both the electrical attachment into the fuel cell and the gas-sealing attachment, as discussed above. End 11a is enlarged to show the attachment surface 88 in better detail, including attachment material 90 and input hole 70. In an alternative embodiment, depicted schematically in FIG. 12B, the elongate body and a portion of the large ends 11a, 11b reside in the furnace or heat source 76, with only the portion containing the attachment surfaces 88 of the large ends 11a, 11b extending outside the furnace 76 for attachment to a substrate. FIGS. 12C-12E schematically depict further alternative embodiments of devices 10 with both ends 11a, 11b having attachment surfaces 88. FIG. 12C is a curved arch instead of being square at the corners. The curved arch shape is easily achieved in a multilayer ceramic device 10, either through machining or through special lamination onto a shaped surface, or by some other method. The curved arch shape can reduce mechanical stress in a device 10 that is subject to heating and cooling. FIGS. 12D and 12E are similar devices 10 and differ from the device 10 of FIG. 12A by extending the elongate body vertically from the ends 11a, 11b, with FIG. 12D depicting a lower vertical profile and FIG. 12E depicting a higher vertical profile.

Figure 13:
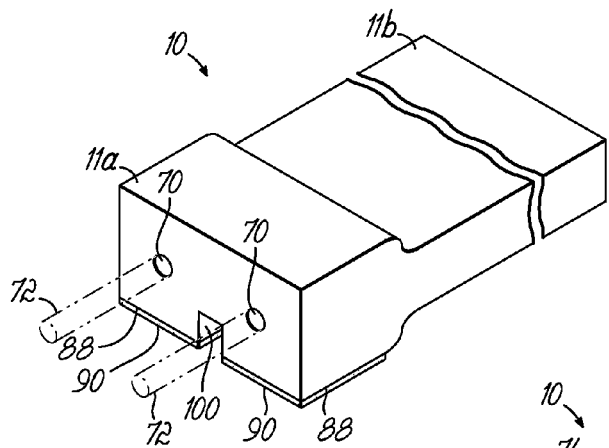

As schematically depicted in FIG. 13, the device 10 can have a mechanical notch 100 in the attachment surface 88 to keep portions of the attachment surface separate from each other (such as to prevent solder wicking between pads). In addition, the thinning and/or narrowing from the enlarged end 11a to the elongate body can be curved, to avoid sharp edges, as shown.

As further shown in FIG. 13, the device 10 can have input holes 70 in the enlarged end 11a for attachment of gas supply tubes 72 for gas entry into the fuel cell in addition to and separate from an attachment surface 88 for mechanical attachment to a substrate. In addition, one or both of the attachment material and gas supply tubes 72 can be conductive to provide electrical connection into the fuel cell. Further, more than one area of attachment material 90 can be used, for example the device can have two or four areas of attachment material 90, which can be useful for serving two or more distinct internal fuel cell regions. Thus, multiple conductive areas of attachment material and/or use of conductive gas supply tubes can provide additional electrical attachment points to the device 10.

Figure 14:
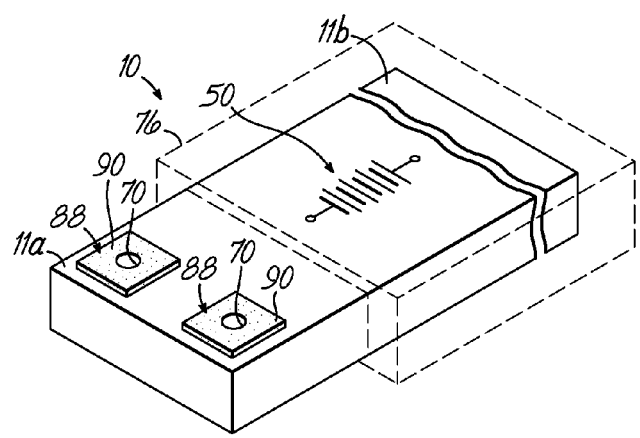
FIG. 14 is a perspective view of an embodiment having an attachment surface.

FIGS. 9A-13 have focused on one or both ends 11a, 11b being enlarged for attachment purposes relative to the main portion of the elongate substrate, which contains the active structure(s) 50 for the active reaction zone. However, certain features described in those embodiments may also be useful for the elongate substrate design having uniform length, width and height from one end 11a to the other end 11b. FIG. 14 depicts a device 10 of uniform dimension that is easier to manufacture because of that uniformity, but that also includes an attachment surface on only one end 11a of device 10. The attachment surface 88 that mounts to a substrate includes the input holes 70 for gas entry and the electrical connections by virtue of using conductive attachment material 90. The opposite end 11b and the portion of the elongate substrate adjacent thereto and containing the active structure(s) 50 are exposed to and/or extend within a heat source 76.

Figure 15:
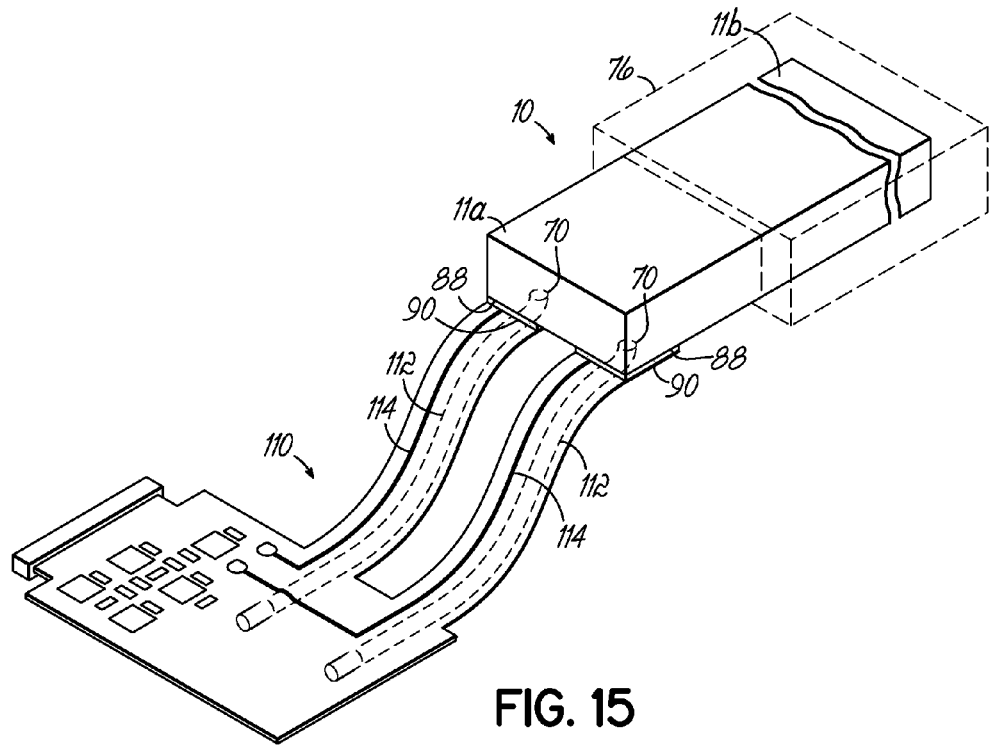
FIG. 15 is a perspective view of the device of FIG. 14 connected to a circuit board using flex circuits.

In one embodiment, shown schematically in FIG. 15, gas supply to the input holes 70 can be achieved with flex circuits 110. Flex circuits are used in modern microelectronics and are distinguished by their flexibility. They are most commonly made from polyimide tape, such as Kapton® by DuPont, which has good temperature stability. Because this material is easily formed into shapes and/or may be multilayer, the flex circuits 110 can be made to contain an open pathway 112 within the flex circuit 110. This pathway 112 can carry gas to the miniature fuel cell device 10, and can also carry the electrical connections 114 to and from the conductive attachment material 90. The flex circuits 110 could attach to the device 10 of FIG. 14, for example. The feed of gas to the flex circuits 110 could come from another set of soldered or glued connections. The flex circuit 110 is unique in the present invention because of its dual role as electrical circuit and gas flow provider.

In addition, the flex circuit could contain all of the necessary control and processing circuitry to serve the fuel cell device 10. A connector could connect to the other circuits in the device 10, and another connector could attach to a thermocouple for additional control of the fuel cell device 10. Gas supply could be attached to the flex circuits 110 using glue or solder, or could be done through a temporary attachment means where the flex circuit mating area is clamped into place on the gas supply. One advantage of this flex circuit method is that the fuel cell device 10 is free of rigid connections, and is therefore more resistant to cracking or physical damage.

Figure 16:
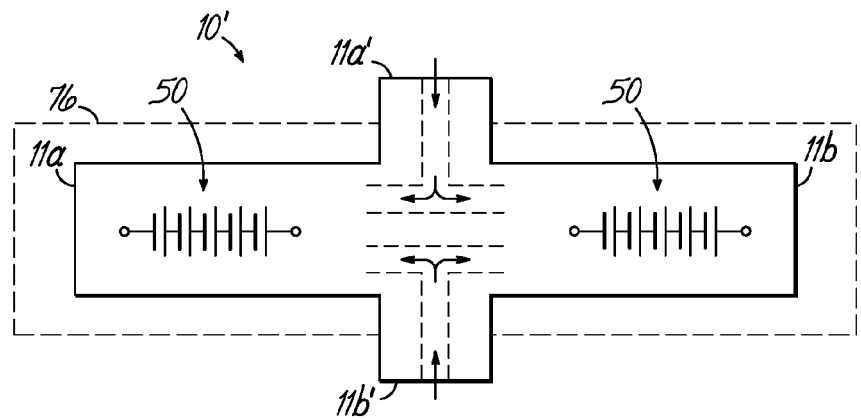
FIG. 16 is a schematic top view of a device having a cross shape with four terminating ends.

In an alternative embodiment, a device 10' is depicted in schematic view in FIG. 16. Device 10' has an elongate substrate extending between first and second opposing ends 11a, 11b and contain active structure(s) 50 therebetween and entirely within the internal support structure. The elongate substrate has a length that is the greatest dimension such that thermal expansion is dominant in that length direction. The elongate body, including ends 11a, 11b, is however contained within a heat source 76, such as a furnace. The device 10' further includes projecting portions that extend outwardly in the width direction from the elongate body and out of the heat source 76, terminating in cold ends 11a', 11b'. The length between cold ends 11a', 11b' is less than the length between hot ends 11a, 11b, but still greater than the width and thickness of the section between ends 11a' and 11b'. Thus, the device 10' has a cross shape with four terminating ends, with the largest area and dimensions of the device 10 inside the hot zone where they experience temperature stability, and two smaller terminating ends that experience temperature gradients along the length direction that exits from the heat source 76. By this design, gases are fed into the device 10 from cold connections to ends 11a', 11b' outside the heat source 76 and electrical connections can likewise be made outside the heat source 76, while the majority of the device 10' including the active structure(s) 50 resides within the heat source 76 and excess gases exit the device 10' in the hot region.

In related U.S. application Ser. No. 12/607,384, FIG. 163 and related discussion relates to an efficiency improvement in which the shape of the gas passage 14, 20 changes along the length of the active zone 33b to provide decreasing volume and thus increasing flow rate in the gas passage 14, 20 to account for the progressive differences in gas composition as the gas proceeds down the length of the active zone 33b. For example, as the oxygen is used up from air, more air flow volume would be required in the oxidizer passage 20 to provide a similar content of oxygen to a given active zone 33b (also true for depletion of fuel in the fuel passage 14 and its replacement by $CO_2$ and $H_2O$). Thus, in that FIG. 163, the width of the flow path narrows in order to give a higher rate of flow.

Figure 17A:
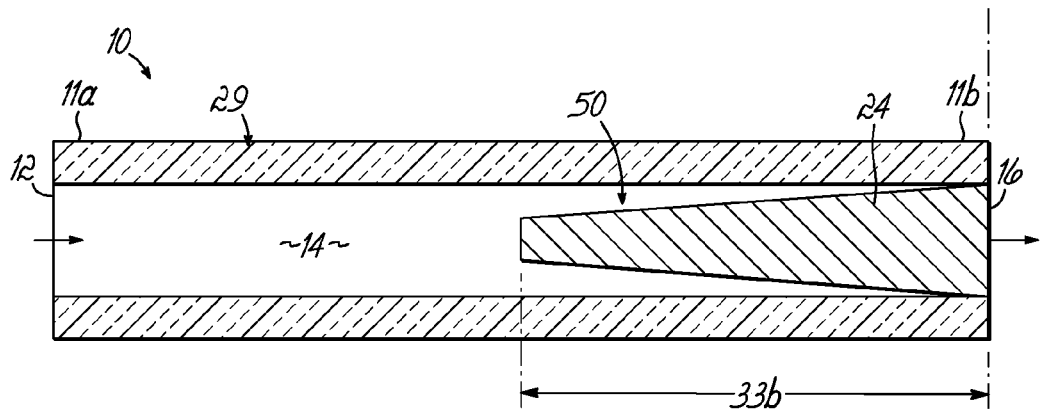
FIGS. 17A and 17B are cross-sectional views through an anode toward a fuel passage depicting increasing width of the active zone down the length of the flow path.

In an embodiment of the present invention, depicted in FIG. 17A in cross-sectional view through the anode 24 in a direction toward the fuel passage 14, energy efficiency may be improved in the device 10 by instead enlarging the area of the anode 24 (and/or cathode 26) down the length of the active zone 33b, e.g., increasing the width of the active zone 33b down the length of the flow path. As the gas flow rate becomes measurably slower the dwell time gradually increases due to the increasing area of the anode 24 (and/or cathode 26), and this increased dwell time will allow greater utilization of the fuel (and oxygen) molecules.

Figure 17B:
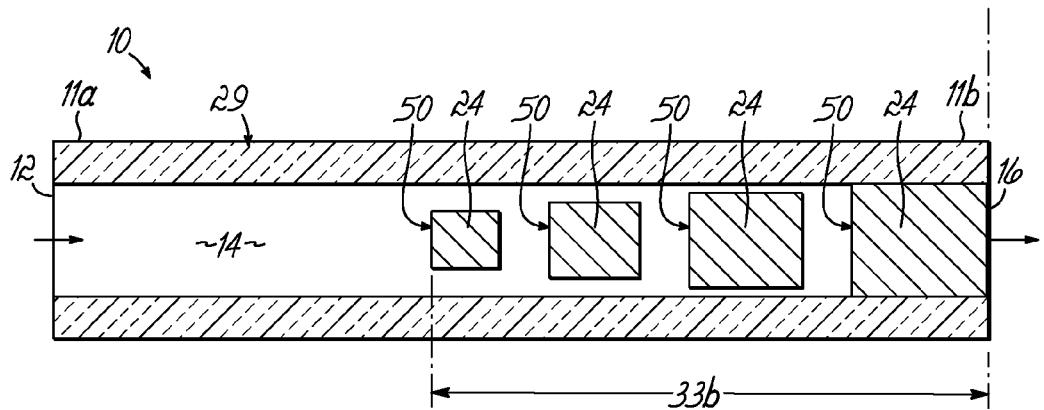

In the embodiment depicted in FIG. 17B, a similar concept is shown for multiple active structures 50 connected in series, where each active fuel cell down the length of the series combination is made slightly larger than the preceding cell. In this way, the active cells along the flow path may then be provided with the same amount of power since the progressively larger cells will have longer dwell time with the progressively depleting gas composition. In other words, as the air and fuel flow down a passage, the useful ingredients in those gases are depleted. It is natural that each cell down the length would give lower power than the previous cell, for example, lower voltage and/or lower current, but by making each cell larger than the last, the issue is counteracted to provide better uniformity of power output between the cells. Together, FIGS. 17A and 17B recognize that the areas of the active structure are progressively non-uniform in size, when compared to the direction of the flow of the gas, either becoming larger or smaller, in order to give preferred properties regarding fuel utilization or total power. The dimension of the active structures can increase, or decrease, as the concentration of useful gases changes in a device, to adapt to the changing properties of the gas.

In one embodiment, a device 10 of the invention includes multiple air and/or fuel output locations. Multiple outputs may provide increased knowledge during testing and development, for example if it is desired to measure the power of an individual active layer and also the gas flow rates for that same layer. Multiple outputs may also be useful where the gases are to be sent in distinct directions at after they have flowed through the device 10.

Figure 18A:
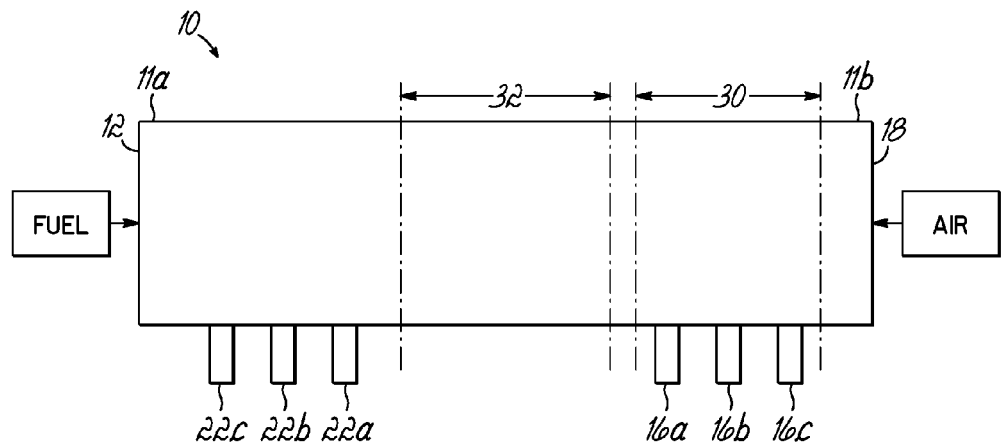
FIGS. 18A and 18B are schematic top and schematic side views, respectively, depicting multiple distinct gas output locations that extend from the elongate body.
Figure 18B:
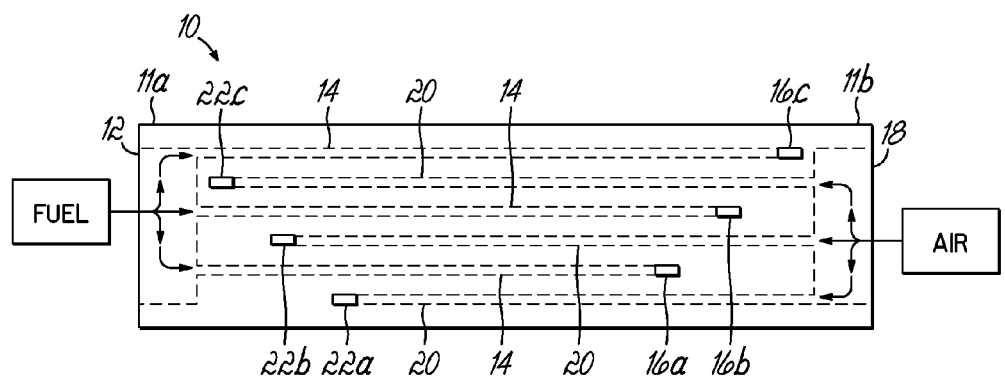

In FIGS. 18A-18B, the device 10 is shown in schematic top view and schematic side view, respectively, having one large gas entry at each end 11a, 11b of the device 10, and three output locations for that same gas flow direction. As shown in FIG. 18B, the device 10 may include three distinct active layers, for example, with each fuel passage 14 having a distinct fuel outlet 16a, 16b, 16c and each oxidizer passage 20 having a distinct oxidizer outlet 22a, 22b, 22c. Alternatively, each output could be serving multiple layers.

Figure 18C:
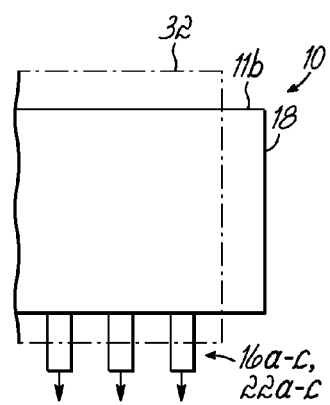
FIGS. 18C and 18D schematically depict alternative arrangements of the output extensions relative to the hot zone.
Figure 18D:
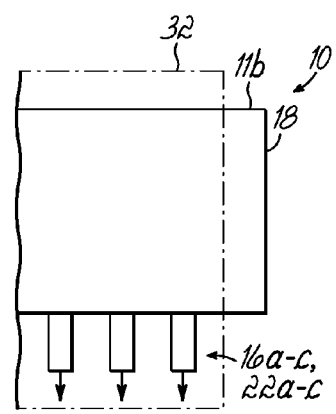

As depicted in FIG. 18A, the hot zone could be in the center of the device, with the ends 11a, 11b of the device and the entire output extensions with outlets 16a-c, 22a-c in the cold zone 30. This arrangement would allow for the gases to cool before leaving the device 10, and thus allow for low temperature connections to be made to collect the exhaust gases. In FIG. 18C, the hot zone 32 could be arranged such that the output extensions are partially within the hot zone 32, but emerging separately such that the exhaust gases are still collected outside the furnace, but the gases may not have cooled appreciably. In yet another alternative, depicted in FIG. 18D, the outputs 16a-c, 22a-c may be completely contained within the hot zone 32.

In U.S. Application Publication No. 2011/0117471, it was disclosed that a conductor metal can be added to sacrificial fibers used to form the air and fuel passages, and after removal of the sacrificial fiber, the conductive metal remains in the passages sintered to the electrode material providing a higher conductive path for electrons to flow out of the device. A similar concept of placing material in the passages includes the use of a catalyst for purposes of reforming the fuel. Reforming means to break down longer carbon chains into smaller carbon chains, and is often accomplished by adding heat and steam. One problem in reforming can be the deposition of carbon, e.g., in the form of ash, onto the walls of the furnace. Catalysts can help prevent this carbon accumulation, and can promote the reforming reaction. Many catalysts are known, including nickel, platinum, palladium, and rhodium, and the catalysts may also be alloys or even catalytic materials on top of other support materials.

Figure 19:
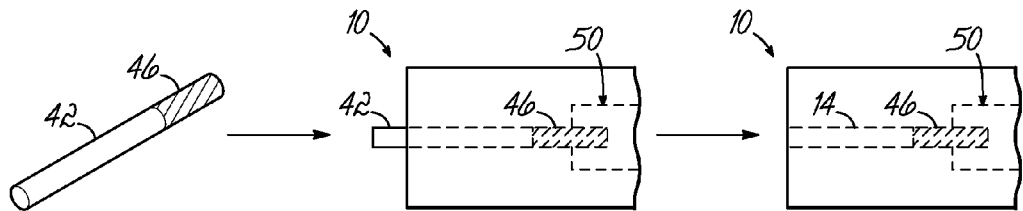
FIG. 19 schematically depicts a method for adding catalyst material to a gas passage in a device of the present invention.

One method of adding a catalyst material to a gas passage, e.g., a fuel passage 14, includes adding particles of catalyst 46 to the outside of a wire 42 that is used to form a gas passage for feeding an active structure 50, as shown schematically in FIG. 19. The particles can be painted on, using a binder to aid in attachment, for example. The wire is then built into the device 10, as discussed in prior related applications, and then the structure is laminated. When the wire 42 is removed, the catalyst 46 is left in place within the formed passage 14. After sintering of the device 10, an integrated catalytic region exists.

Similarly, catalyst can be provided in a gap formed by fugitive or sacrificial materials, as shown in FIGS. 12, 13A and 13B of U.S. Application Publication No. 2011/0117471, which is incorporated herein by reference in its entirety. The gap tape or fibers 41 can be formed with a region containing particles of catalyst, and then after sinter the catalyst will be left in place.

The location of the catalyst 46 can be chosen to be optimal when compared to the temperature gradients that are present across the operating device. For example, one desirable location for the catalyst 46 may be in the hot zone 32 of the device 10. Alternatively, the catalyst may be incorporated in the transition zone 31 where the temperature is changing from cold to hot; for example, the catalyst particles could be incorporated along a region that extends from a region that is substantially cool to a region that is substantially hot, which may include the portion of the device that passes through the wall of the furnace 76. The presence of the catalyst may help prevent build-up of carbon materials in that transition zone 31.

In another embodiment of the invention, a device is provided that addresses polarity mismatches between external surface conductors and the internal electrodes. As discussed above, and with reference to FIG. 5A, a voltage drop may occur between the outside conductor 44 on the device 10 and the internal conductor or electrode 24, which makes it appear that the device 10 lacks an optimal (as measured) OCV. The non-conductive surface layer 60 in the above embodiment is one method for addressing the issue. Another method for addressing the issue takes into account the atmosphere in which the device operates. For a fuel cell device that is operating in an air or oxidizing atmosphere, the polarity that exists between the outside of the device and some internal location would be a polarity between the outside air surface and an inside fuel surface. Similarly, if the device is operating in a reducing atmosphere (for example to facilitate the use of pure nickel or copper conductors on the outside of the device), then the polarity that exists would be from the outside-fuel surface and an inside-air surface.

Figure 20A:
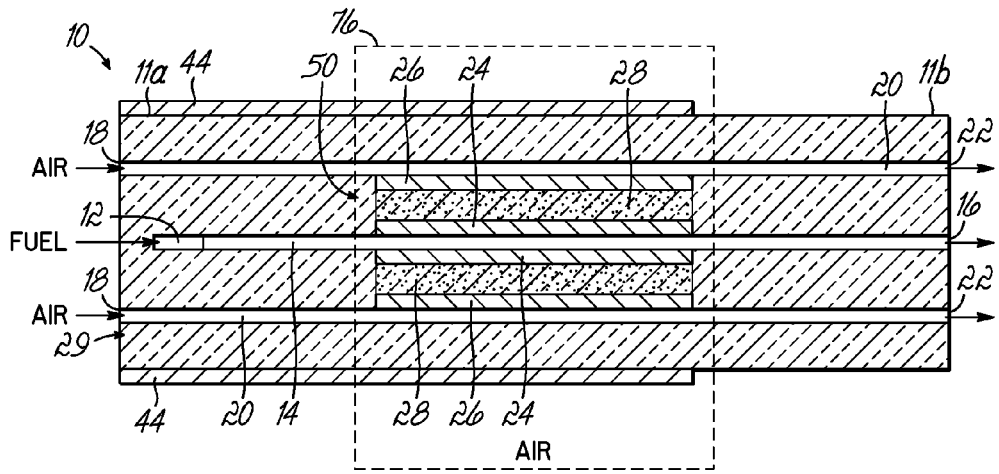
FIGS. 20A and 20B are side cross-sectional views depicting embodiments that address polarity mismatches between external surface conductors and internal electrodes.
Figure 20B:
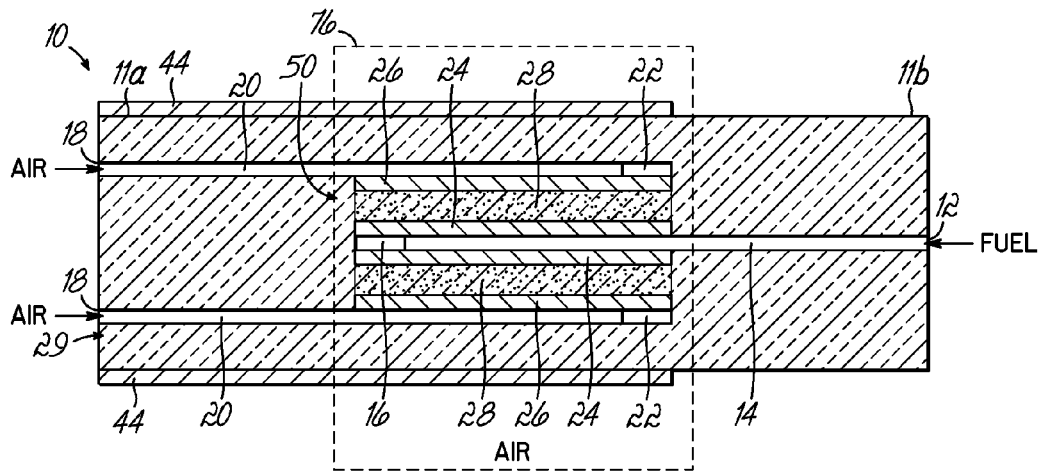

To reduce the interaction between the surface conductor 44 and the opposite internal electrode, the device 10 can be arranged to provide shielding between those two points. In FIG. 20A depicted in side cross-sectional view, for an air atmosphere in furnace 76, the device 10 is arranged so that the active structure 50 begins and ends with a cathode 26 (e.g., air side of the cell) and also so that the gas passages begin and end with oxidizer passages 20. The polarity between the outside of the device 10, which is exposed to air, and the closest internal passage 20, which also carries air and is adjacent the cathode 26, is minimized through this construction technique. As seen in FIG. 20, the surface conductors 44 can be on the ceramic surrounding support structure 29, or surface non-conductive layers 60, e.g., passivation layers, can be used therebetween as described in reference to FIG. 5A, for example. In addition, the active structure 50 could be reversed where the atmosphere in the furnace 76 contains some amount of fuel such that the atmosphere is reducing, e.g., the active structure 50 would have fuel passages 14 and anodes 24 closest to the surface conductors 44. In general, this design allows for surface conductors 44 to be placed on both the top and bottom surface of the device 10 because the internal active structure 50 is coordinated with the surface, in terms of polarity.

Alternatively, the active structure 50 could be arranged to begin with air and end with fuel, but then surface conductors 44 are only placed on the surface that has the sympathetic polarity (e.g., in a device that exists in an air atmosphere furnace, surface conductors would only be placed on the surface that is closest to the air passages 20). In another alternative, depicted in side cross-sectional view in FIG. 20B, the internal design is similar to that of FIG. 20A, but air enters from one end 11a of device 10, and fuel enters from the other end 11b, but all excess or exhaust gases exit from the center of the device 10. In this case, the surface conductors 44 may be placed over any sympathetic portion of the device 10, which includes the top and bottom surfaces in the example shown. While other factors in a device 10 may still lead to some amount of misleading voltage drop in the measurement, the above embodiments can help reduce the issue.

Figure 21:
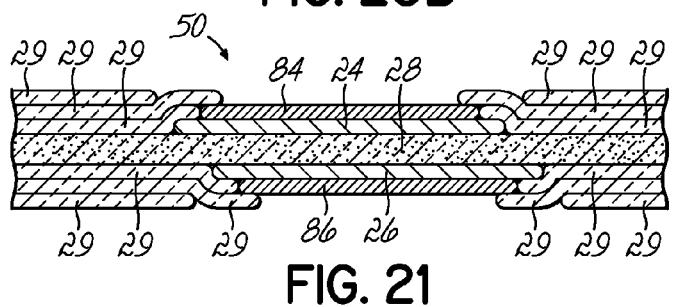
FIG. 21 schematically depicts in side cross-section a method for building a device with electrodes having rounded corners.

The shrinkage of the layers of the active structure 50 and the efforts to have the anode 24, electrolyte 28 and cathode 26 sinter together are challenging. Various efforts to match the materials to each other have been described, but challenges can still be present. One way to alleviate these problems is to round the corners of the anodes 24 and cathodes 26 when building up the green stack in order to reduce the stress concentration at any one point. FIG. 21 depicts schematically the build-up of an active structure 50 with layers that have rounded corners. Other shapes are possible such that they minimize stress at corners by eliminating sharp points or 90 degree angles. In addition, the materials of the anode 24 and cathode 26, and associated current collectors 84, 86, can be distributed so that they do not line up over one another in an exact pattern, as further depicted in FIG. 21. For example, an anode 24 can be larger than its corresponding current collector 84 (these are two parts electrodes, one part optimized for chemical activity, and the other part optimized for current carrying). The benefit is found because this difference spreads out the forces associated with the materials, through any mismatch that occurs. These differences diffuse the stress over a larger area, compared to a perfect registration of one pattern on top of another. A similar effect can be found by providing a misalignment of an anode 24 over a cathode 26, as is also shown in FIG. 21.

Figure 22:
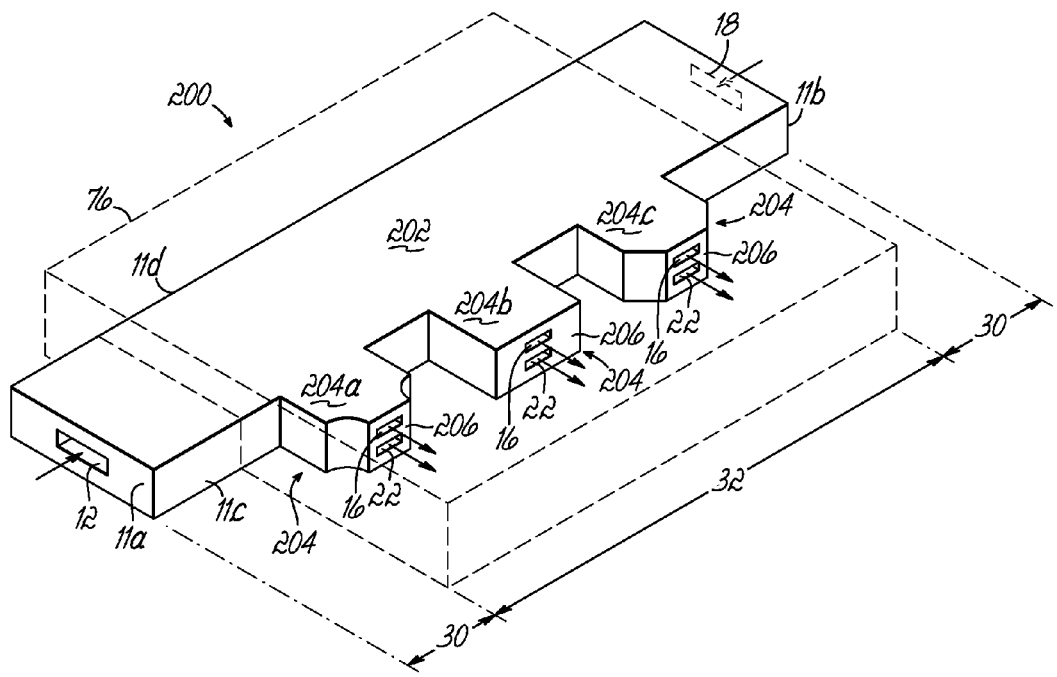
FIG. 22 depicts in schematic perspective view a device having an elongate backbone section and distinct elongate active sections extending therefrom.

To reduce the stress and expansion problems during start up, a device 200 is shown in FIG. 22 that is similar in design to FIGS. 120 and 131A of co-pending U.S. Application Publication No. 2010/0104910, which is incorporated herein by reference in its entirety. The device 200 of FIG. 22 includes an elongate backbone section 202 having opposing input ends 11a, 11b in a cold, inactive zone 30 for the fuel inlets 12 and oxidizer inlets 18, respectively. In the hot, active zone 32, a plurality of elongate active sections 204a, b, c, etc. (collectively labeled 204) extend from one side 11c (or from both sides 11c, 11d, not shown) and terminate at ends 206 in exhaust fuel and oxidizer outlets 16, 22. An advantage of this design over a different design with the same total area but in one solid piece is that this design could have an easier time adapting to a rapid heat-up. By breaking up the design into smaller elongate active sections 204, the rate of rise could be faster than the rate of rise on a device 10 of similar mass but one large area.

Each elongate active section 204 may contain one or more active cells. Cells from one elongate active section 204 may be connected in series or parallel combinations with the cells in other elongate active sections 204. The elongate backbone section 202 may contain additional active structure, or may contain only gas distribution passages, such as artery flow paths, described in the immediately above-referenced publication. Rather than the square or rectangular shape depicted for elongate active section 204b, the ends 206 of the elongate active sections 204 can be tapered in a scalloped fashion, as shown with elongate active section 204a, or in a pointed fashion, as shown with elongate active section 204c to reduce the dimension in the area where the excess fuel is emitted so as to reduce the expansion at the tips from the heating by the unburned fuel. Although more complex in design, the gas passages can be made to flow back into the elongate backbone section 202 for exit elsewhere from the device 200. For example, both gases may be inputted at end 11a, snake through each elongate active section 204, and exit from end 11b.

As discussed in related applications referenced above, embodiments my include contact pads or surface conductors 44 that are applied along the sides of a device 10 to make electrical connections or contacts between different electrodes, e.g., parallel and series connections. The following includes additional embodiments for making external connections.

Figure 23A:
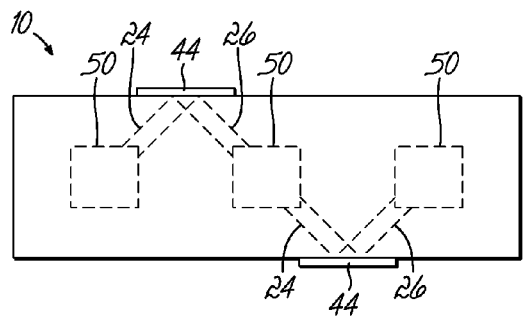
FIGS. 23A and 23B depict in schematic top view and end cross-sectional view, respectively, embodiments for making series and parallel external connections.
Figure 23B:
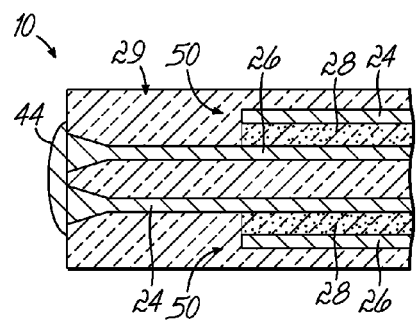

In FIGS. 23A and 23B, an anode 24 or cathode 26 from each of two active structures 50 can be extended to the side (edge) of the device 10 and a common contact pad 44 applied over them to form a series or parallel connection between them (series connection shown). In FIG. 23A, a top view is depicted of a device 10 having three active structures 50 in series down the length of the device 10. In FIG. 23B, a cross-sectional view is depicted of two active structures 50 stacked vertically in a device 10 and connected in series. Active structures 50 arranged in both vertical stacks and length-wise fashion can be combined and connected in parallel and/or series arrangements to increase the power of the device 10.

Figure 24:
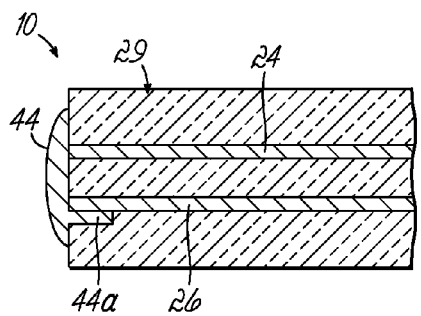
FIG. 24 depicts in end cross-sectional view an embodiment having the external metallization penetrating inside the device for bonding to the electrode surface.

In one embodiment, shown in FIGS. 23B and 24, gap-forming material (not shown) is used at the edge of the electrodes when building up the green structure to create a larger void at the edge of the device 10 after lamination and sintering, so that the applied metal of contact pad 44 will flow into the edge of the device 10. This penetrating metal 44a that enters the gap will form a 3-dimensional bond onto the electrode, which will give lower ESR. In FIG. 24, for comparison purposes, the anode 24 is shown where no gap-forming material was used, such that the contact is only made to the edge or side of the anode 24, whereas the cathode 26 is shown with penetrating metal 44a that that fills a gap and bonds to the surface of the cathode 26. Without this penetrating metal 44a, the anode 24 forms a point contact at the edge of the device 10, which will likely have higher resistance. Having the lowest resistance possible is advantageous because these contacts may be carrying moderate or high currents during normal operation, and they could fail (burn open) if the resistance is high. In addition, any resistive losses at the contact pads 44 are wasted power that can't be used by the overall system. Thus, it is advantageous to have the electrodes come to the edge of a device 10, but with a gap formed at the edge, so that the applied metal for contact pad 44 can touch the surface of the electrode, and not just the side of the electrode.

Figure 25:
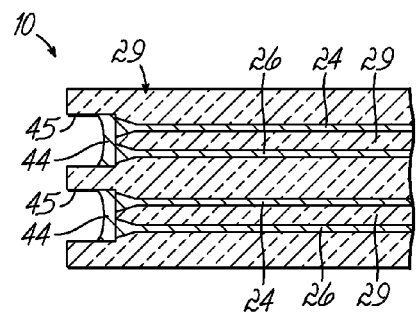
FIG. 25 depicts in partial end cross-sectional view recessing of the external contact pad.

In another embodiment, of particular use where a side of the device 10 will include multiple distinct contact pads 44, the contact pads 44 are recessed into the edge of the device 10. In other words, the pairs of electrodes (one electrode from each of two adjacent cells) that reach the edge are inside a large void 45 and the contact pad 44 is applied within the void 45, as shown in schematic cross-section in FIG. 25. An advantage of this embodiment is the ability to form distinct edge connections, close to each other but not shorting. This can then be repeated many times on one side of the device 10, and the electrodes would never be shorting. The scale of this structure, along with the repetition, could be made very small.

Figure 26A:
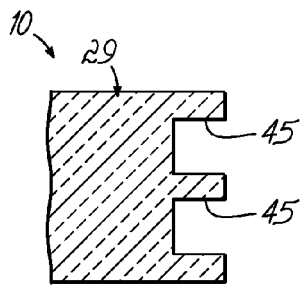
FIGS. 26A-26C schematically depict in cross-section a method for recessing the contact pads.
Figure 26B:
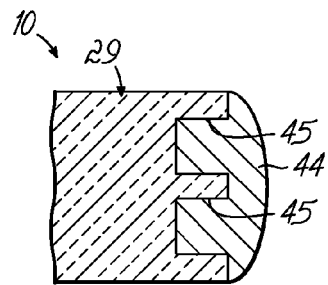
Figure 26C:
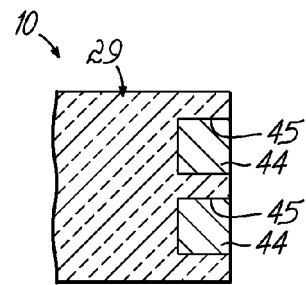

FIGS. 26A-26C schematically depict one method for creating recessed contact pads 44. In FIG. 26A, voids 45 are created at the side of the device 10. In FIG. 26B, the voids 45 are over-filled so as to coat the side of the device 10 with metal. In FIG. 26C, the side of the device 10 is sanded or ground to remove the excess material. A sintering step may occur between the over-filling and sanding steps, but is not necessary. Also, it is not necessary to have the excess metal, i.e., it can be a filling step rather than an over-filling step, but it is more convenient to over-fill and then clean up the side edge after firing. Further, because the metal has penetrated into gaps at the edge of the device 10, followed by a polishing or clean-up step, the device 10 is left with very distinct metallization lines along the edge of the device 10. In the sanding or polishing step, it is also preferable to remove a small amount of the ceramic surrounding support structure 29 or body of the device 10, for a very clean final appearance.

Figure 27:
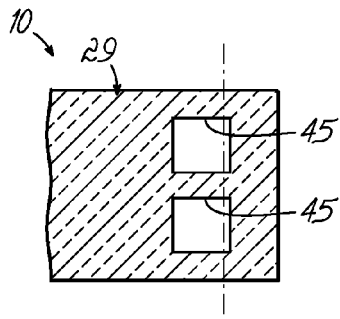
FIG. 27 schematically shows in cross-section an alternative method for recessing the contact pads.

In yet another variation on the method depicted in FIGS. 26A-C, the voids 45 may be created inside the edge of the device 10 during the build-up process, and only exposed to the edge after the device 10 is sintered, to avoid the possibility of de-lamination. Stress during sintering can pull at the edges of a multi-layer structure, and if a starter gap is present, a de-lamination can occur. Thus, as shown in FIG. 27, the gap-forming material may be used within ceramic layers to form internal voids 45 inside the device 10 near the edge, followed by exposing the voids 45 through a polish or removal process that removes the ceramic surrounding support structure 29 to the dotted line. This ensures that the device 10 has maximum strength through the manufacturing process. The steps of FIGS. 26A-C could then be performed to create the recessed contact pads 44.

Figure 28A:
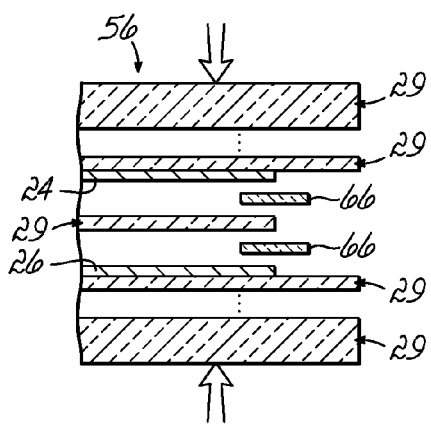
FIGS. 28A-28D depict in schematic cross-section a method for forming a series connection using a recessed contact pad that penetrates into the device to bond with the surface of the electrode.
Figure 28B:
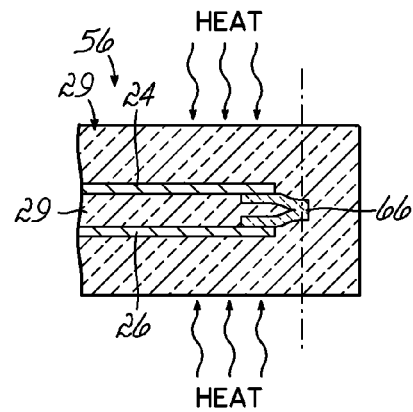
Figure 28C:
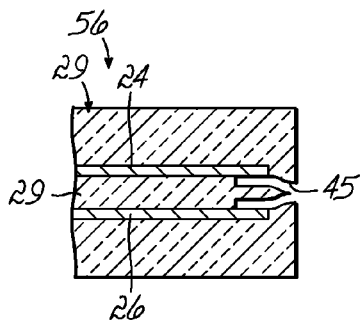
Figure 28D:
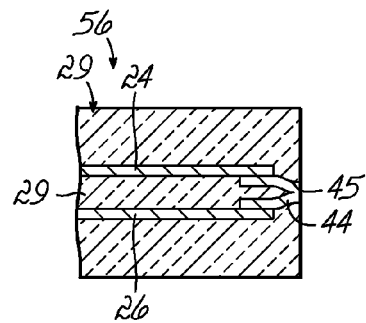

FIGS. 28A-28D depict an embodiment for forming a device 10 that combines the concepts of FIGS. 24 and 26C, including how layers and gap-forming material could be combined to form this structure, which includes connecting in series the anode 24 of one active structure 50 to the cathode 26 of an adjacent active structure 50. In FIG. 28A, ceramic layers for forming supporting structure 29, layers for anode 24 and cathode 26, and gap forming material layers 66 are assembled into a green material stack, and the stack is laminated by applying pressure. The series of dots indicates the existence of additional layers that form the remainder of each of the two active structures, but which are omitted in the depiction for visual simplicity. FIG. 28B schematically shows the side margin 56 of the structure after lamination. Heat is then applied to sinter the green materials, and then ceramic material from layers 29 is polished away from the side margin 56 to the dotted line. FIG. 28C depicts the structure after sinter and polishing off the edge material to expose the void 45. FIG. 28D depicts the device 10 after metallization and polishing away any excess metal to form the recessed contact pad 44 that is bonded to the surface of each of the anode 24 and cathode 26 to form strong bonds between the electrodes and the series connection metallization.

Figure 29:
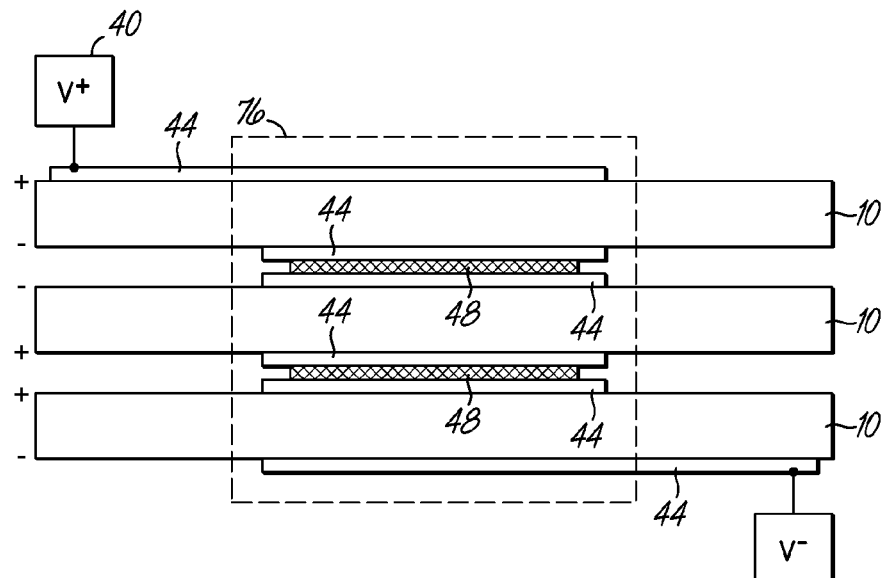
FIG. 29 schematically depicts a method for connecting devices in series.

According to another embodiment, and as shown in FIG. 29, a stack of devices 10 is formed using a conductive metal felt 48, such as nickel felt. In accordance with an embodiment, each device 10 has a surface conductor 44 on each of the top side and the bottom side, in the hot zone 32. One of these surface conductors 44 has positive polarity, and one has negative polarity. A plurality of these devices 10 is then stacked together, forming a bundle that gives high total power. The conductive metal felt 48 is placed between the positive terminal of one device and the negative terminal of the next device, thus linking those two devices in series. Other metals can be used besides nickel, including copper, precious metals, or other non-noble metals. The use of certain metals such as nickel as the conductive metal felt 48 requires that the furnace 76 be operating in a reducing atmosphere; that is, there is a net fuel-rich atmosphere of such an extent that it prevents the metal, such as nickel, from turning into metal oxide, such as nickel oxide. In addition, the surface conductors 44 between devices 10 need not extend outside the furnace 76, whereas on the top and bottom devices 10 in the stack, a conventional surface conductor 44 is present on the surface to take electricity to the outside of the furnace 76. An advantage of using the conductive metal felt 48 is that the connection between the devices 10 may have a lower resistance than if each device 10 had connections that came to the outside of the furnace 76. Therefore, this technique can give lower system losses.

In providing high strength and integrity to the active structures 50 of the device 10, there are competing factors in the design considerations. One factor is that the electrolyte 28 is advantageously very thin, to give the best ion transport. Another factor is the thickness of the anodes 24 and cathodes 26. If they are too thin, then they may not transportions or electrons well enough; but if they are too thick, they may slow down gas transport, or they might cause mismatch problems with the other materials in the device 10.

Figure 30:
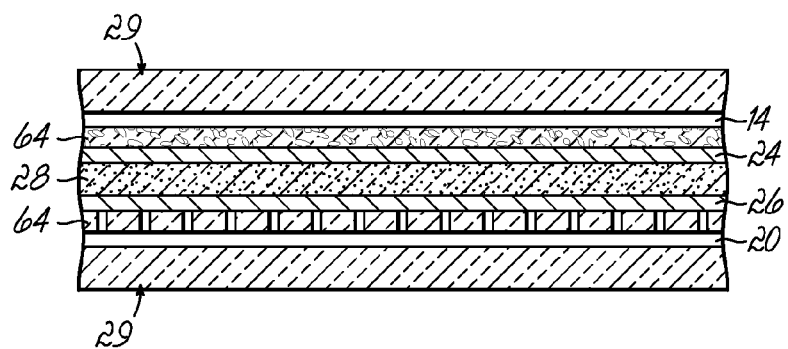
FIG. 30 is a partial cross-sectional view of an embodiment having porous ceramic added to the top and bottom of the active structure on the electrodes.

In accordance with one embodiment, depicted in partial cross-section in FIG. 30, porous ceramic 64, such as YSZ (or an equivalent), is added to the top and bottom of the active structure 50 on the electrodes. By using this technique to add thickness to the active structure 50, it allows the electrolyte 28 to be made as thin as possible without weakening the overall active structure 50. In addition, it permits optimizing the thickness of the anode 24 or cathode 26 without regard to other considerations, such as strength of the overall structure. Also, without adding this extra ceramic, issues such as CTE (coefficient of thermal expansion), shrinkage and overall compatibility of the three layer active structure 50 (anode 24/electrolyte 28/cathode 26) would be dominated by the anode 24 and cathode 26, whereas this technique shifts the balance back toward the properties of the porous ceramic 64, assuming that the same type of ceramic, e.g., YSZ that is non-porous or porous, forms all or a portion of the bulk material that is used to create the surrounding support structure 29.

The porosity of the porous ceramic 64 is critical to the function of the active structure 50, since it must allow transport of gas through the pores. The pores can be created by the use of pore-forming materials, various organic particles or fibers, as described above, such that a network of pores is created throughout the porous ceramic 64, as shown above the anode 24. Also, the pores can be formed through the use of via punching techniques, so that the pores are actually large, vertical openings, as shown below the cathode 26. Also, the porous ceramic 64 can be achieved by using calcined ceramic (e.g., YSZ) particles, or simply very large ceramic particles, such that they do not sinter well at the temperatures used for sintering the overall device 10. Combinations of these methods can be used concurrently.

In some devices 10 of the invention, depending on the operating gases and temperatures, it is possible that carbon buildup can occur in the gas passageways, for example, in the entry passages in the cold zone 30, in areas where reforming happens, or in the area of temperature transition, from cool to hot, i.e., the transition zone 31. Two solutions to carbon buildup include providing an increased temperature gradient at the entryway, temporarily, to clean out carbon, and/or altering the gas composition, temporarily, in a cleaning step.

Figure 31:
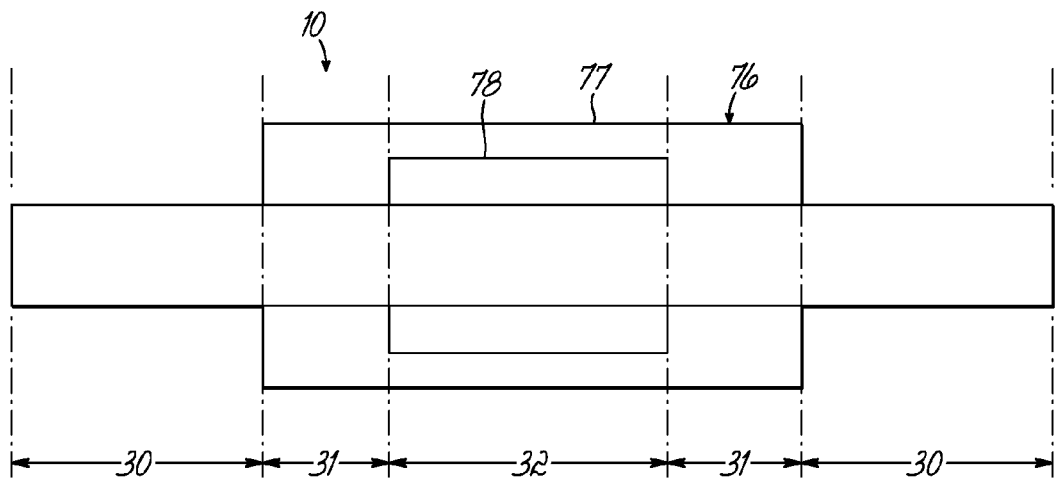
FIG. 31 is a schematic view of a double-walled furnace for operating and cleaning devices of the invention.

With the understanding that carbon can be effectively removed in air at temperatures that exceed a threshold temperature, but that below the threshold temperature, it is possible that carbon can remain in ceramic structures, it may be contemplated that carbon could build up in regions of a device 10 where the transitional temperature of the device 10 is below the threshold temperature, such as in the wall of the furnace 76 and/or the transition zone 31, while the hot zone 32 operates above the threshold temperature. Thus, the hot zone 32 could be made to expand to a larger area that encompasses the transition zone 31 for a cleaning step. In one embodiment, depicted schematically in FIG. 31, the furnace 76 containing the device 10 has a double wall with an outer wall 77 encompassing all or a portion of the transition zone 31 and the inner wall 78 encompassing the hot zone 32, with heating elements (not shown) placed between the two walls 77, 78. When the device 10 is operating in fuel cell mode, the heating elements between walls 77, 78 are not turned on, such that transition zone 31 operates as intended as the temperature transition area from cold to hot (and hot to cold). When the device 10 is operated in cleaning mode, the heating elements are turned on to heat the additional enclosed area above the threshold temperature to remove any carbon buildup, thereby cleaning passages outside the hot zone.

In another embodiment, the composition of the fuel gas stream that is entering the device can be modified to alter the ppm (parts per million) oxygen content in the fuel stream. The partial pressure of oxygen in the fuel stream, as measured in ppm, can be modified by adding water vapor to the fuel gas, for example. The stability balance between carbon and carbon monoxide (C/CO) is dependent on the ppm of oxygen present, and the temperature. By varying the temperature in the passages and/or by varying the oxygen content, the equilibrium can be shifted to cause carbon to change to carbon monoxide. Similarly there is an equilibrium between Ni/NiO that is dependent on temperature and ppm of $O_2$, such that the modifications should be selected so as to not also change the nickel metal into nickel oxide at the anode.

Finally, the entire device could be baked at high temperature on a periodic basis to clean the internal passages. A device 10 will have an optimal usage temperature, for example, 900° C., and a cleaning bake temperature may then be set above the optimal usage temperature, for example, 1000° C. This higher temperature could be conducive to cleaning unwanted materials out of the device 10. However, precautions may be needed prior to implementing a full-device bake, for example, removal of any low temperature connections that might be compromised by the high temperature bake.

For the cleaning operations described above, a control system could perform the cleaning process automatically on some pre-determined schedule, such as based on hours of operation or amount of power generated, or it could perform the process based on measurements taken in real time. The cleaning process could again combine one or both of a change in chemical composition of the incoming fuel stream or a change in temperature in all or part of the device.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A fuel cell device, comprising:
   one or more active structures each having an anode and cathode in opposing relation with an electrolyte therebetween; and
   a surrounding support structure including a top cover region, a bottom cover region, opposing side margin regions, and optional interposer layer regions, the surrounding support structure positioned in surrounding relation to the one or more active structures and being monolithic with one of the anode, cathode or electrolyte of each of the one or more active structures,
   wherein a material composition used for the surrounding support structure includes a modification configured to alter the shrinkage properties of the surrounding support structure to more closely match shrinkage properties of the one or more active structures than in the absence of the modification, said modification including one or more of the following:

(a) where the surrounding support structure comprises a ceramic material that is monolithic with the electrolyte, the material composition includes an addition of anode or cathode material in one or more of the regions;

(b) where the surrounding support structure comprises an anode material that is monolithic with the anode, the material composition includes an addition of electrolyte or cathode material in one or more of the regions;

(c) where the surrounding support structure comprises a cathode material that is monolithic with the cathode, the material composition includes an addition of electrolyte or anode material in one or more of the regions;

(d) an addition of an inorganic shrinkage control material to the material composition that is not present in the one or more active structures;

(e) an increase in particle size used for the material composition than the particle sizes of materials used in the one or more active structures;

(f) a decrease in particle size used for the material composition than the particle sizes of materials used in the one or more active structures; or (g) an addition of an organic fugitive material to the material composition that is not present in the one or more active structures or in an amount greater than present in the one or more active structures, which organic fugitive material is removed during baking and/or sintering of the material composition to form pores or voids in the surrounding support structure.

2. The fuel cell device of claim 1, including modification (a), wherein the addition includes alternating composite layers of anode material and cathode material, each mixed with electrolyte material.

3. A fuel cell device, comprising:
an active structure having an anode and cathode in opposing relation with an electrolyte therebetween;
an inactive surrounding support structure monolithic with the electrolyte and defining a first portion of an outer surface of the device, wherein the inactive surrounding support structure lacks the anode and cathode in opposing relation and the active structure resides within the inactive surrounding support structure with the anode exposed at a second portion of the outer surface and the cathode exposed at a third portion of the outer surface;
a first surface conductor on the second portion of the outer surface in electrical contact with the exposed anode and extending over the first portion of the outer surface;
a second surface conductor on the third portion of the outer surface in electrical contact with the exposed cathode and extending over the first portion of the outer surface;
a non-conductive, insulating barrier layer between the active structure and the first and second surface conductors extending over the first portion.

4. The fuel cell device of claim 3, wherein the non-conductive, insulating barrier layer is a surface layer that lies between the first portion of the outer surface and the first and second surface conductors extending over the first portion.

5. The fuel cell device of claim 3, wherein the non-conductive, insulating barrier layer is an internal layer that lies within the surrounding support structure between the first portion of the outer surface over which the first and second surface conductors extend and the active structure.

6. The fuel cell device of claim 3, wherein the non-conductive, insulating barrier layer is glass or non-conducting ceramic.

7. The fuel cell device of claim 3, further comprising an internal non-conductive passivation layer adjacent to one or both of the exposed anode and exposed cathode within the inactive surrounding support structure.

8. A fuel cell system, comprising:
a fuel cell device having first and second opposing ends with an elongate body therebetween comprising an active structure having an anode and cathode in opposing relation with an electrolyte therebetween, and an inactive surrounding support structure monolithic with the electrolyte and lacking the anode and cathode in opposing relation, wherein the active structure resides within the inactive surrounding support structure, and wherein the inactive surrounding support structure adjacent the first opposing end is larger in at least one dimension relative to a remainder of the elongate body to form a first enlarged attachment surface at the first opposing end;
a heat source for applying heat to the fuel cell device, wherein at least a first portion of the elongate body containing the active structure resides within the heat source and at least a second portion of the elongate body including the first opposing end containing the first enlarged attachment surface resides outside the heat source; and
an insulating material between the first and second portions of the elongate body shielding the first opposing end from the heat source.

9. The fuel cell system of claim 8, further comprising one or more resistance heating elements on a surface of the portion of the elongate body residing within the heat source and coupled to end contacts on a surface of the elongate body residing outside the heat source.

10. The fuel cell system of claim 8, wherein the inactive surrounding support structure adjacent the second opposing ends is larger in at least one dimension relative to the remainder of the elongate body to form a second enlarged attachment surface at the second opposing end, and a third portion of the elongate body including the second opposing end containing the second enlarged attachment surface resides outside the heat source with the insulating material further between the first and third portions of the elongate body shielding the second opposing end from the heat source.

11. A fuel cell device comprising:
first and second opposing ends defining an elongate body therebetween of length greater than width and thickness,
an active structure in the elongate body having an anode and cathode in opposing relation with an electrolyte therebetween, and
an inactive surrounding support structure monolithic with the electrolyte and lacking the anode and cathode in opposing relation, the active structure residing within the inactive surrounding support structure,
wherein the width of one or both of the anode and cathode progressively changes along the length of the elongate body in the active structure.

12. The fuel cell device of claim 11, wherein the width increases continuously.

13. The fuel cell device of claim 11, wherein the active structure comprises a plurality of cells electrically connected in series, each having the anode and cathode in opposing relation with the electrolyte therebetween, wherein the width for each cell progressively changes along the length.

14. The fuel cell device of claim 13, the width for each cell is greater than that of the preceding cell.

15. A fuel cell device, comprising:
a multilayer active structure having electrode layers in opposing relation with an electrolyte therebetween, the electrode layers alternating in polarity from a top electrode layer to a bottom electrode layer;
an inactive surrounding support structure monolithic with the electrolyte and defining an outer surface of the device including a top surface, a bottom surface and opposing side surfaces, wherein the inactive surrounding support structure lacks the electrode layers in opposing relation and the active structure resides within the inactive surrounding support structure with at least one electrode layer of each polarity exposed at one of the opposing side surfaces;
a first surface conductor on the outer surface in electrical contact with the exposed electrode layer of one polarity;
a second surface conductor on the outer surface in electrical contact with the exposed electrode layer of the other polarity,
wherein the first and second surface conductors are configured to have a designated polarity in use, wherein one or both of the first and second surface conductors extend onto the top or bottom surface, and wherein the polarity of the top electrode layer is the same as the designated polarity when one or both of the first and second surface conductors extend onto the top surface and the polarity of the bottom electrode layer is the same as the designated polarity when one or both of the first and second surface conductors extend onto the bottom surface to prevent polarity mismatches between the surface conductors and the electrode layers within the inactive surrounding support structure.

16. A fuel cell system comprising:
a fuel cell device having a length between opposing first and second ends that is the greatest dimension whereby the device exhibits thermal expansion along a dominant axis that is coextensive with the length, an active heated region along a first portion of the length, an inactive cold region along a second portion of the length adjacent one or both of the opposing first and second ends, an inactive transition region along a third portion of the length between the first portion and the second portion, and an electrolyte disposed between an anode and a cathode in the active heated region, wherein the anode and cathode each have an electrical pathway extending to an exterior surface of the inactive cold region for electrical connection;
a double wall furnace comprising an inner wall and an outer wall, the inner wall defining an inner chamber therein and the outer wall defining an outer chamber, wherein the fuel cell device is positioned with the first portion of the length within the inner chamber, the third portion of the length within the outer chamber, and the second portion of the length outside the furnace; and
a first heating element coupled to the inner chamber for heating the active heated region to a temperature above a threshold temperature for a fuel cell reaction to occur therein;
a second heating element coupled to the outer chamber and operable to switch between an off position where the inactive transition region has a temperature below the threshold temperature when the active heated region is above the threshold temperature and an on position where the inactive transition region has a temperature above the threshold temperature for cleaning gas passages within the inactive transition region;
a control system coupled to the first and second heating elements and configured to switch the second heating element between the off and on positions based on one of a pre-determined cleaning schedule or a cleaning schedule triggered by real time measurements.

* * * * *